(No Model.) 16 Sheets—Sheet 1.
C. SINNING.
LASTING MACHINE.
No. 518,932. Patented Apr. 24, 1894.
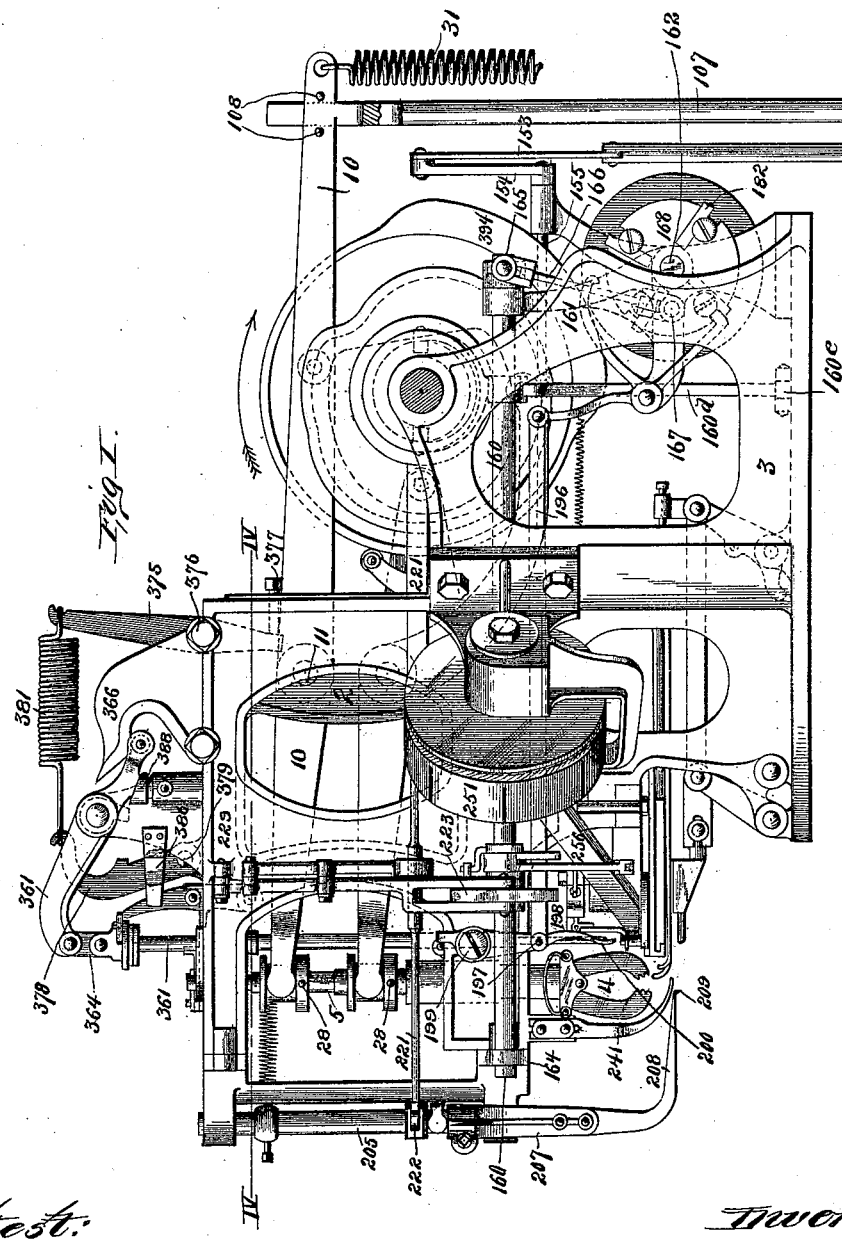
Inventor:
Charles Sinning (No Model.) 16 Sheets—Sheet 2.
C. SINNING.
LASTING MACHINE.
No. 518,932. Patented Apr. 24, 1894.
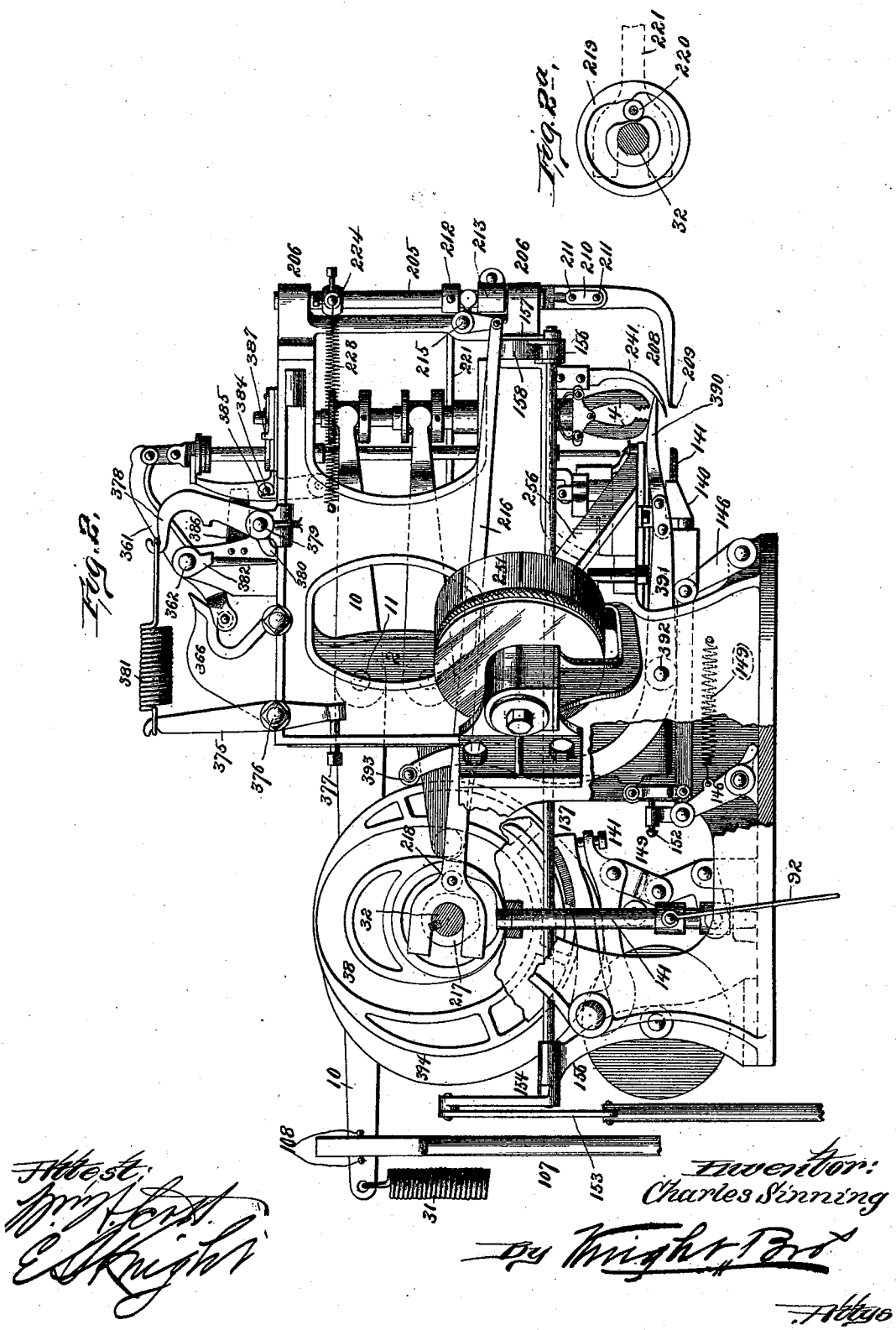
Inventor:
Charles Sinning
by Wright Bro
Attys

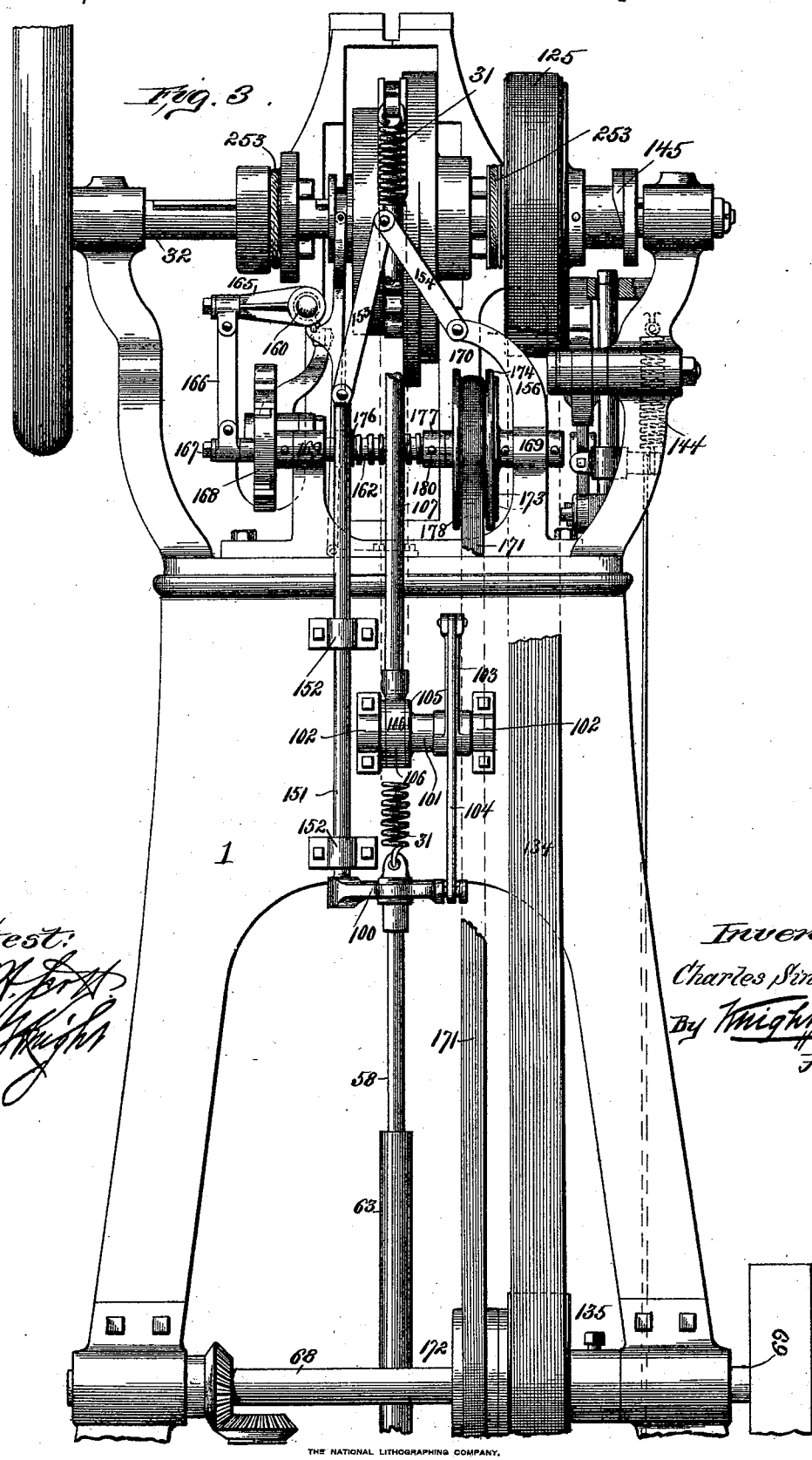

(No Model.) 16 Sheets—Sheet 4.
C. SINNING.
LASTING MACHINE.
No. 518,932. Patented Apr. 24, 1894.
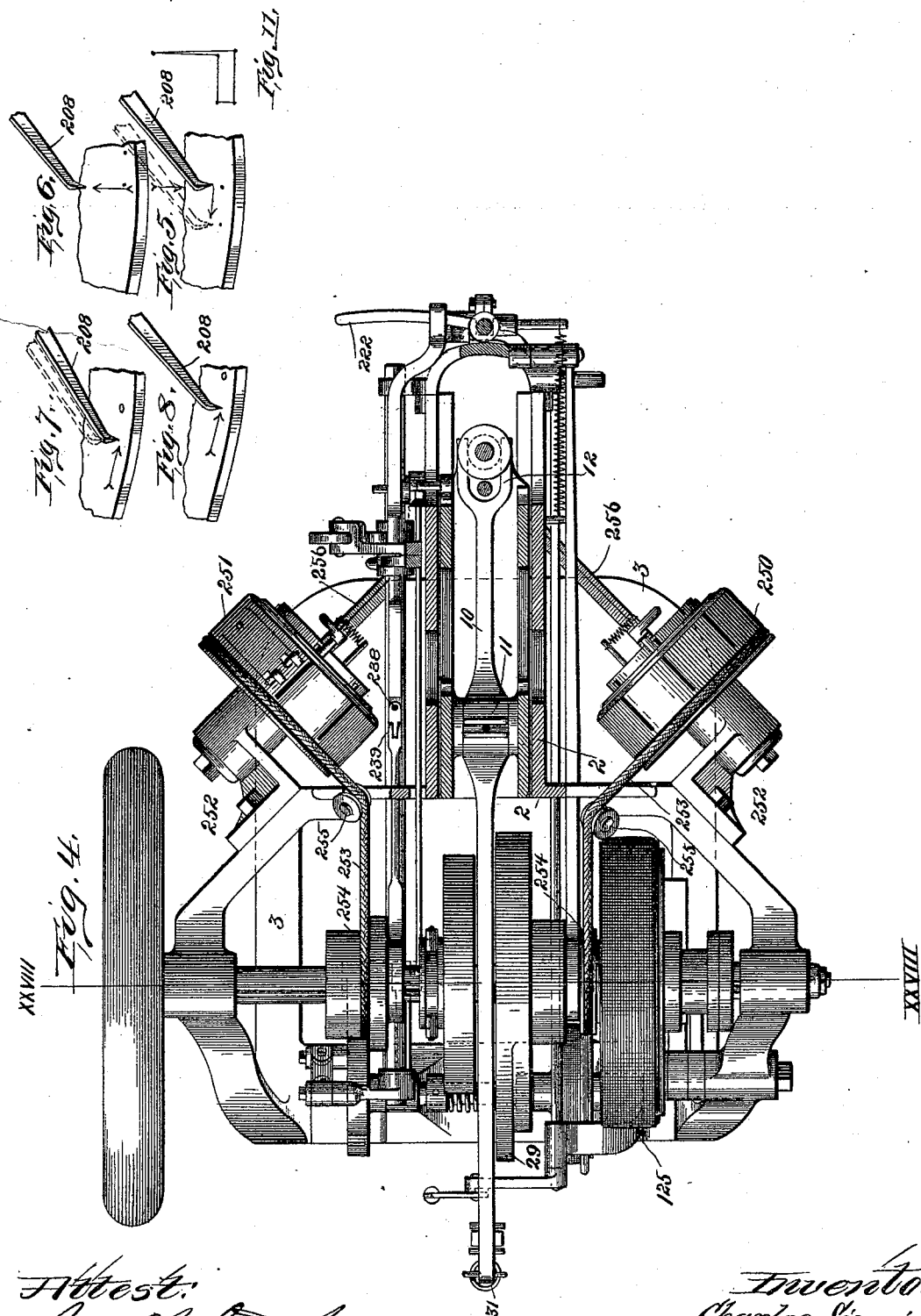
Attest:
W. H. Forth
E. S. Knight
Inventor:
Charles Sinning
By Knight Bro
Attys.

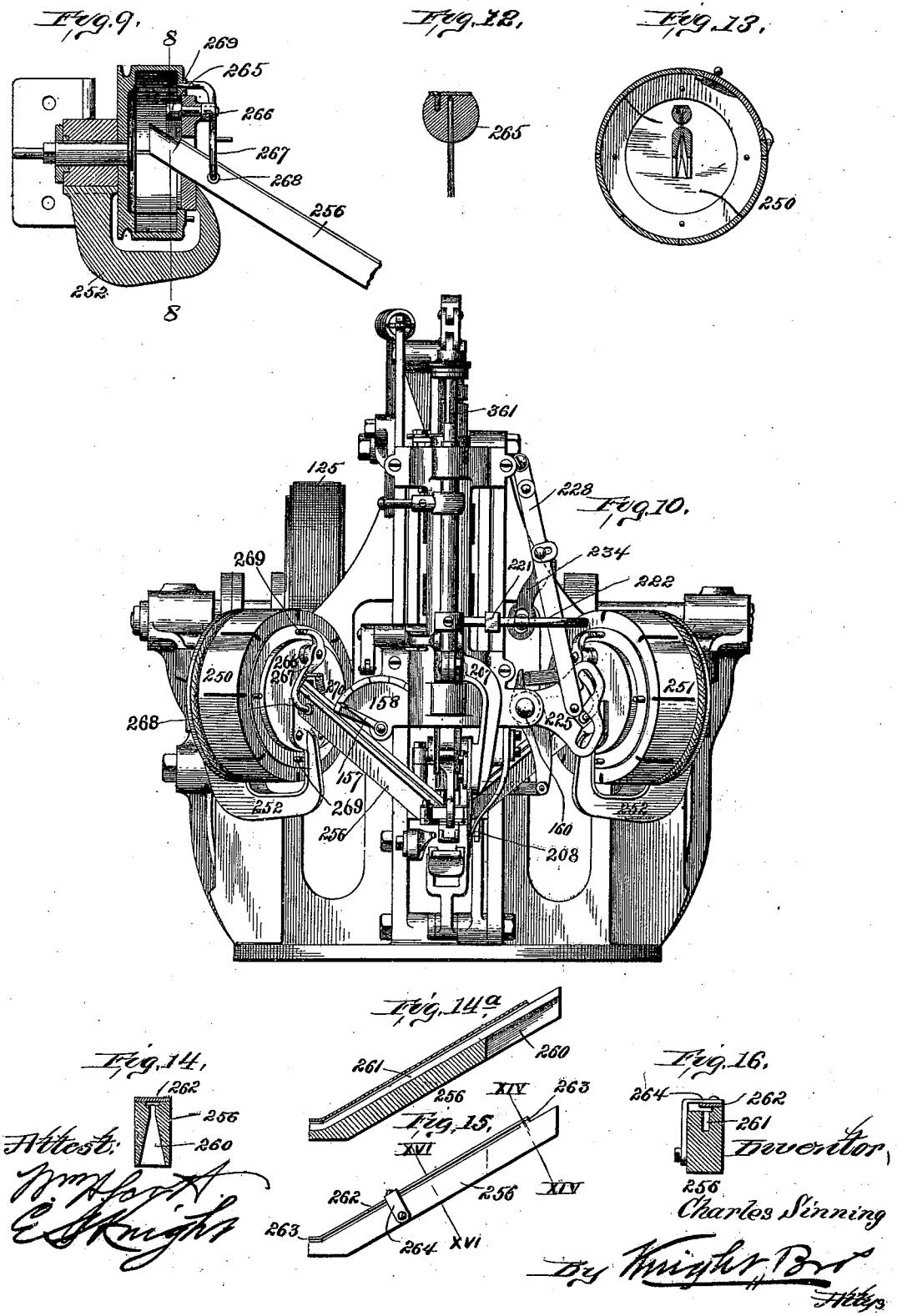

(No Model.)
16 Sheets—Sheet 6.
C. SINNING.
LASTING MACHINE.
No. 518,932. Patented Apr. 24, 1894.
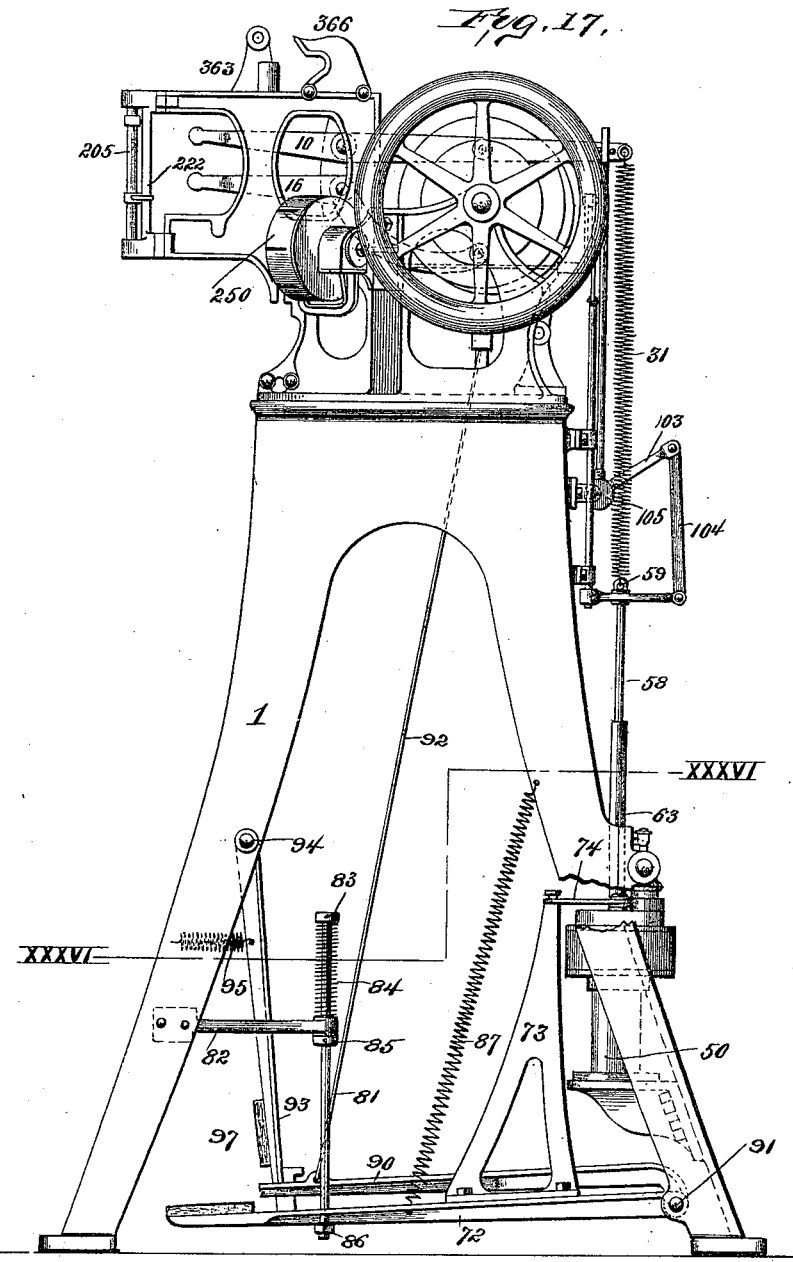
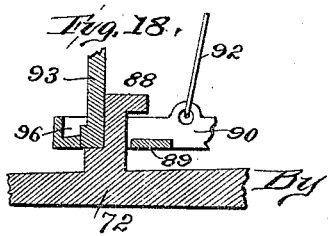
Attest:
Inventor:
Charles Sinning
By Knight Bros
Atty (No Model.) C. SINNING. 16 Sheets—Sheet 7.
LASTING MACHINE.
No. 518,932. Patented Apr. 24, 1894.
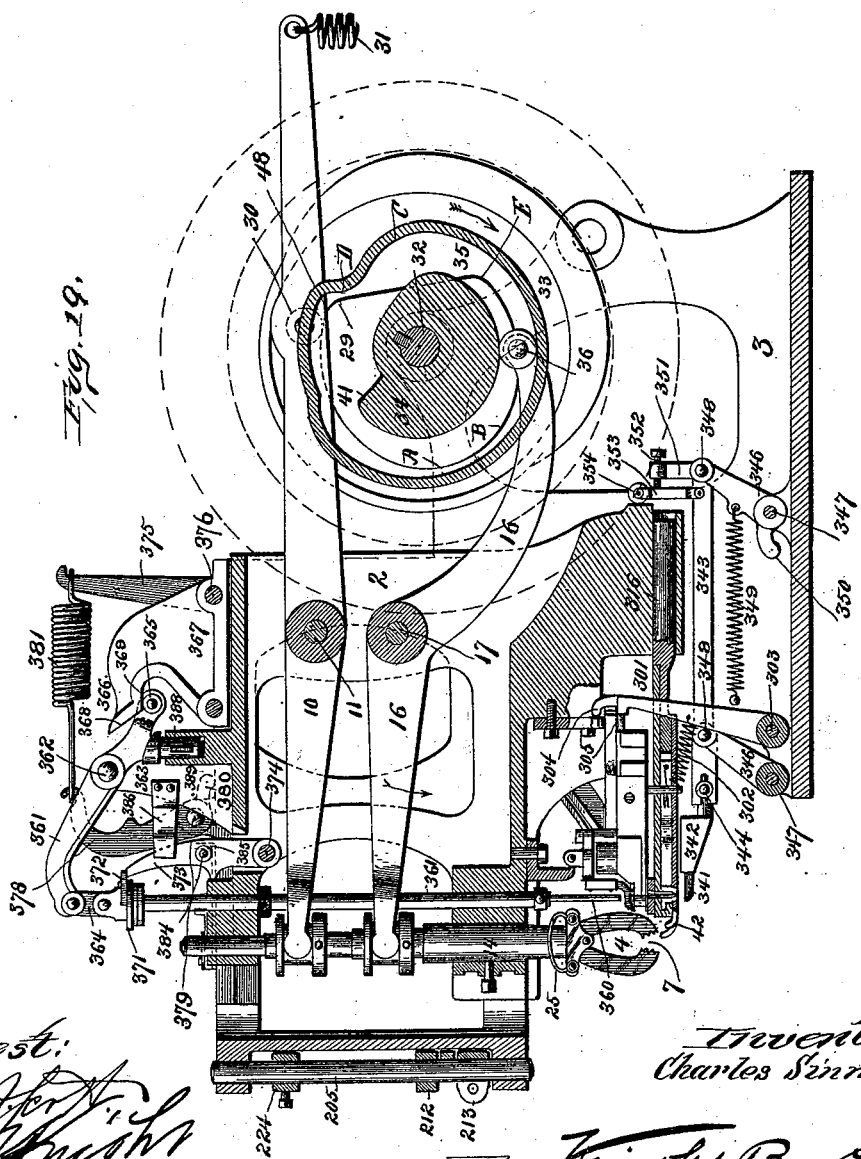

(No Model.) 16 Sheets—Sheet 8.
C. SINNING.
LASTING MACHINE.
No. 518,932. Patented Apr. 24, 1894.
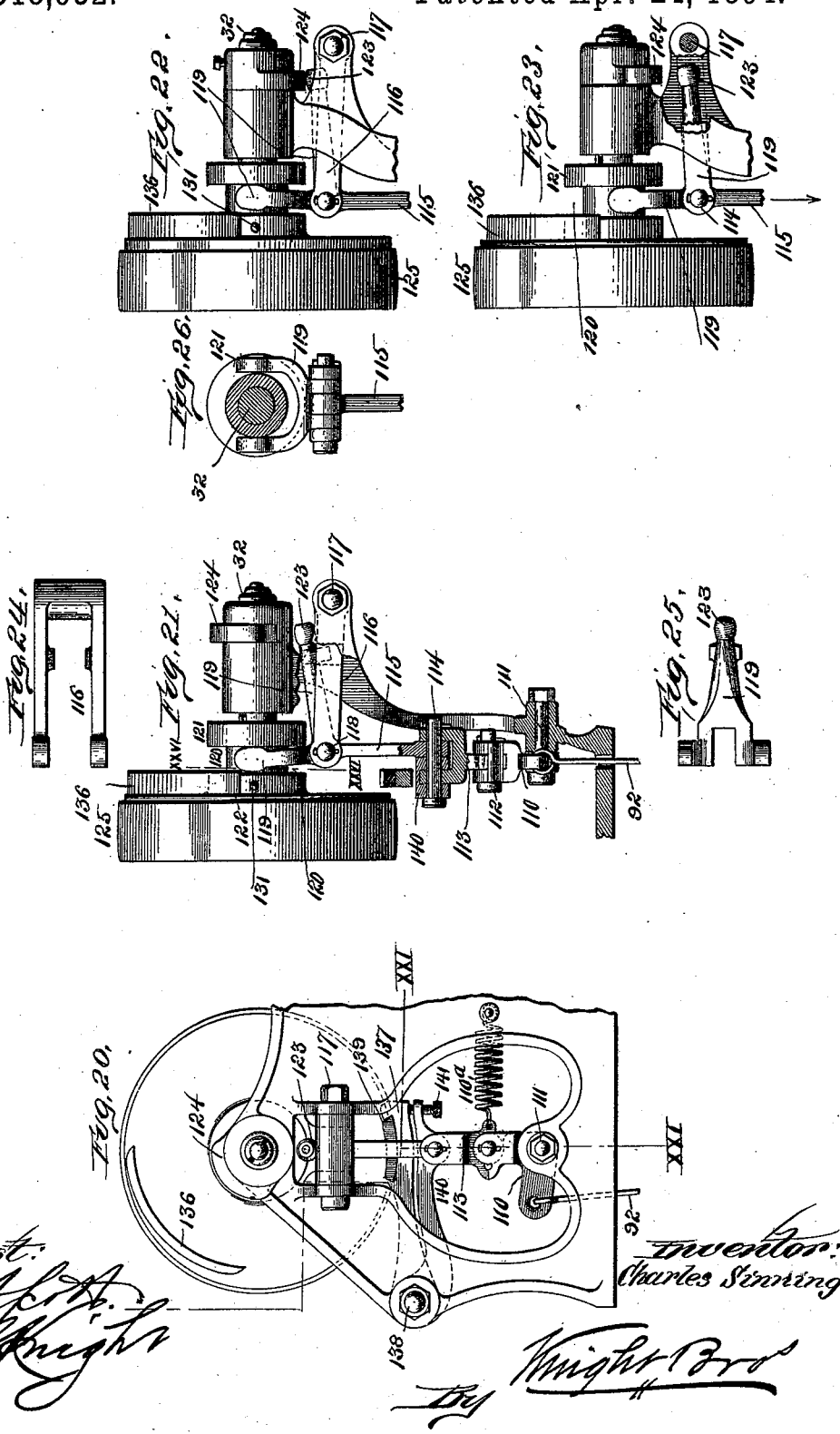
Inventor: Charles Sinning

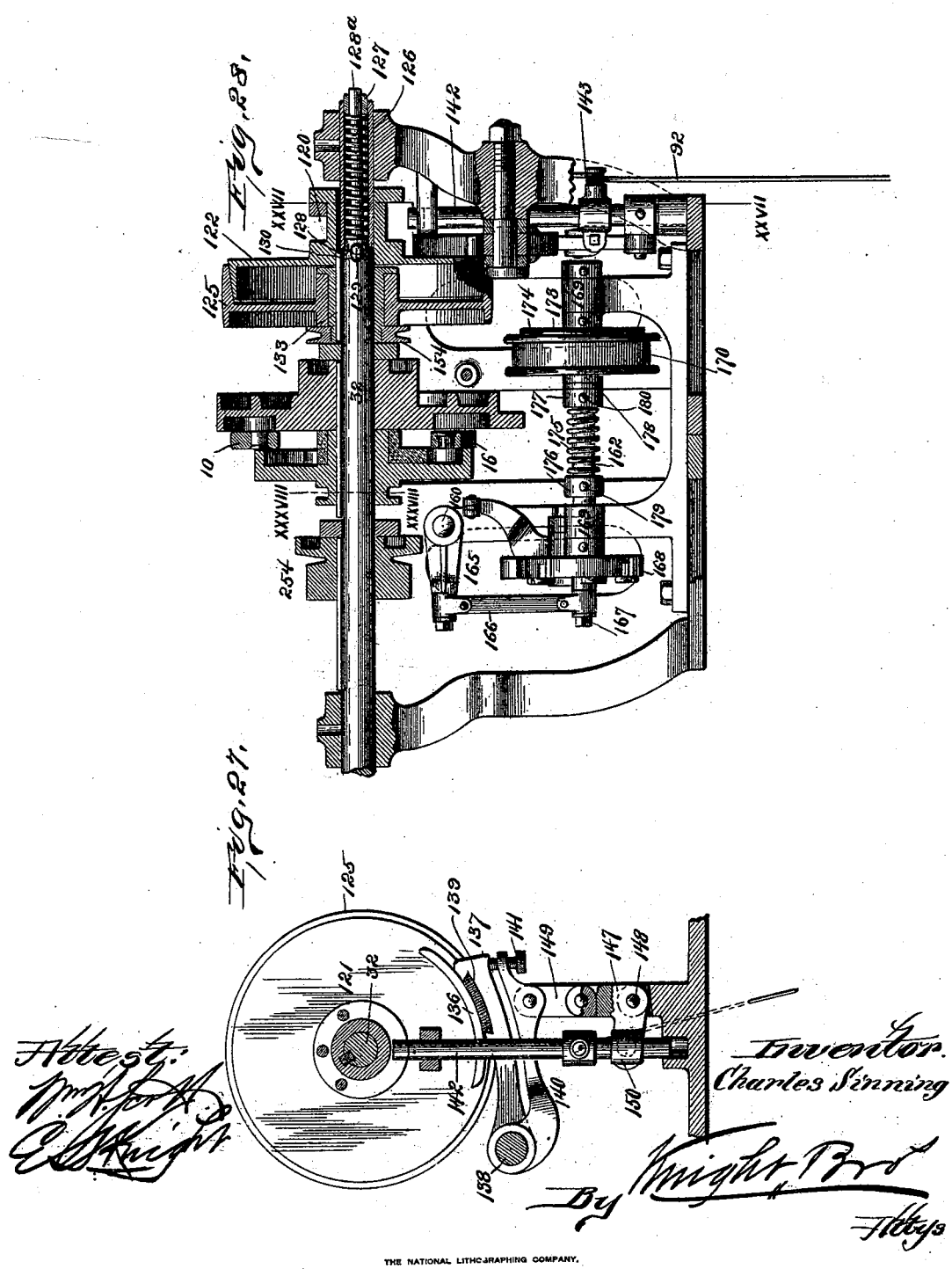

(No Model.) 16 Sheets—Sheet 10.
C. SINNING.
LASTING MACHINE.
No. 518,932. Patented Apr. 24, 1894.
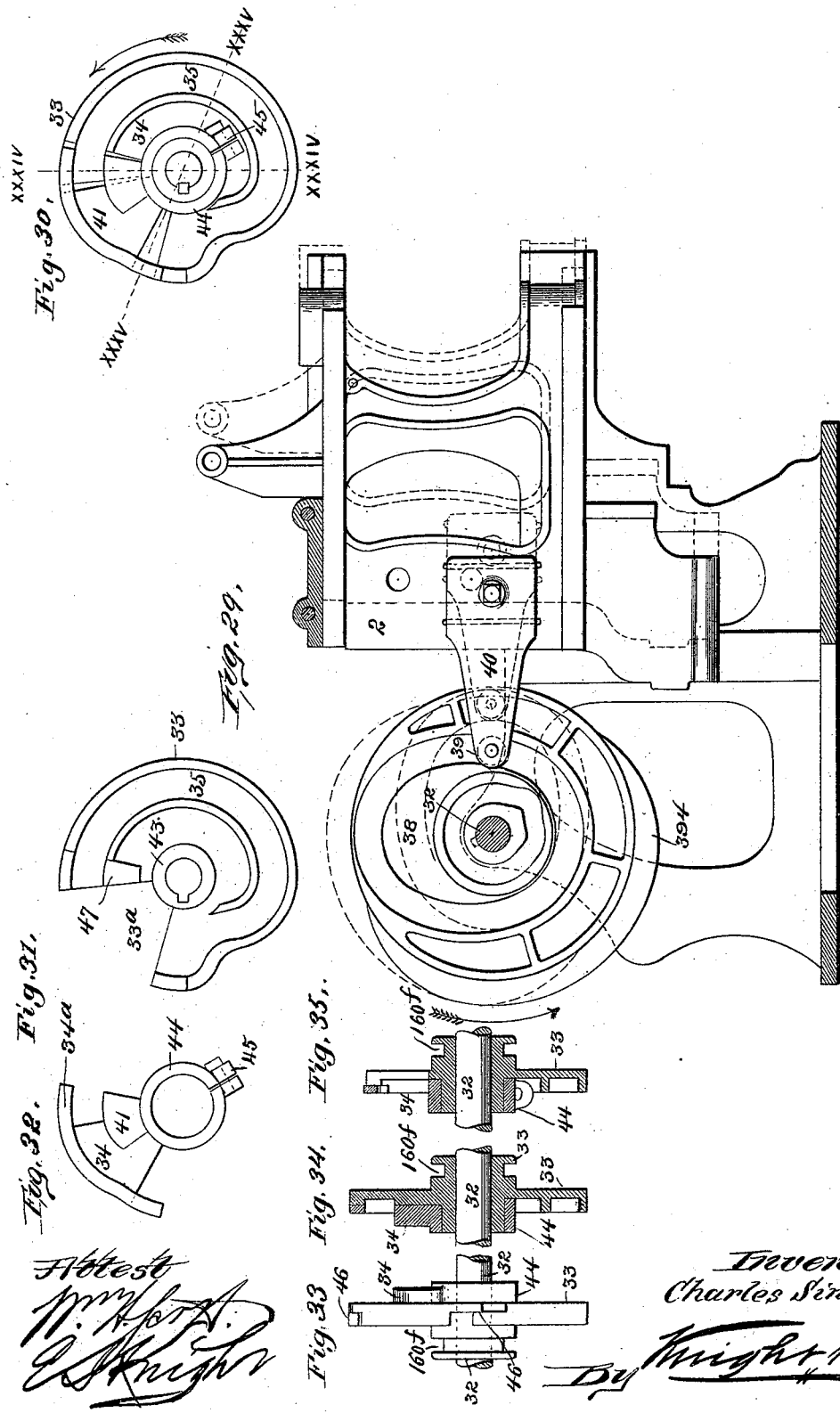

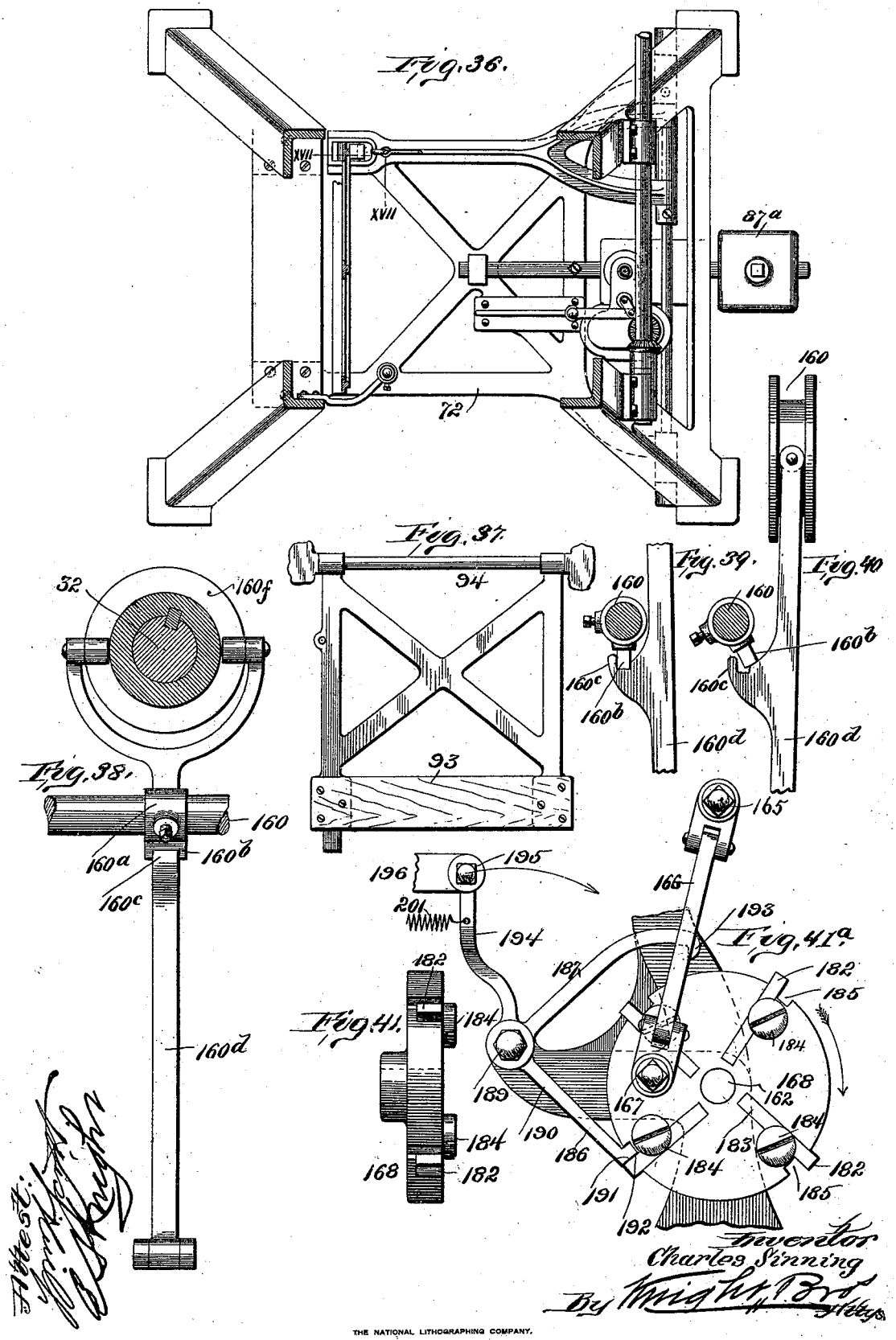

(No Model.) 16 Sheets—Sheet 12.
C. SINNING.
LASTING MACHINE.
No. 518,932. Patented Apr. 24, 1894.
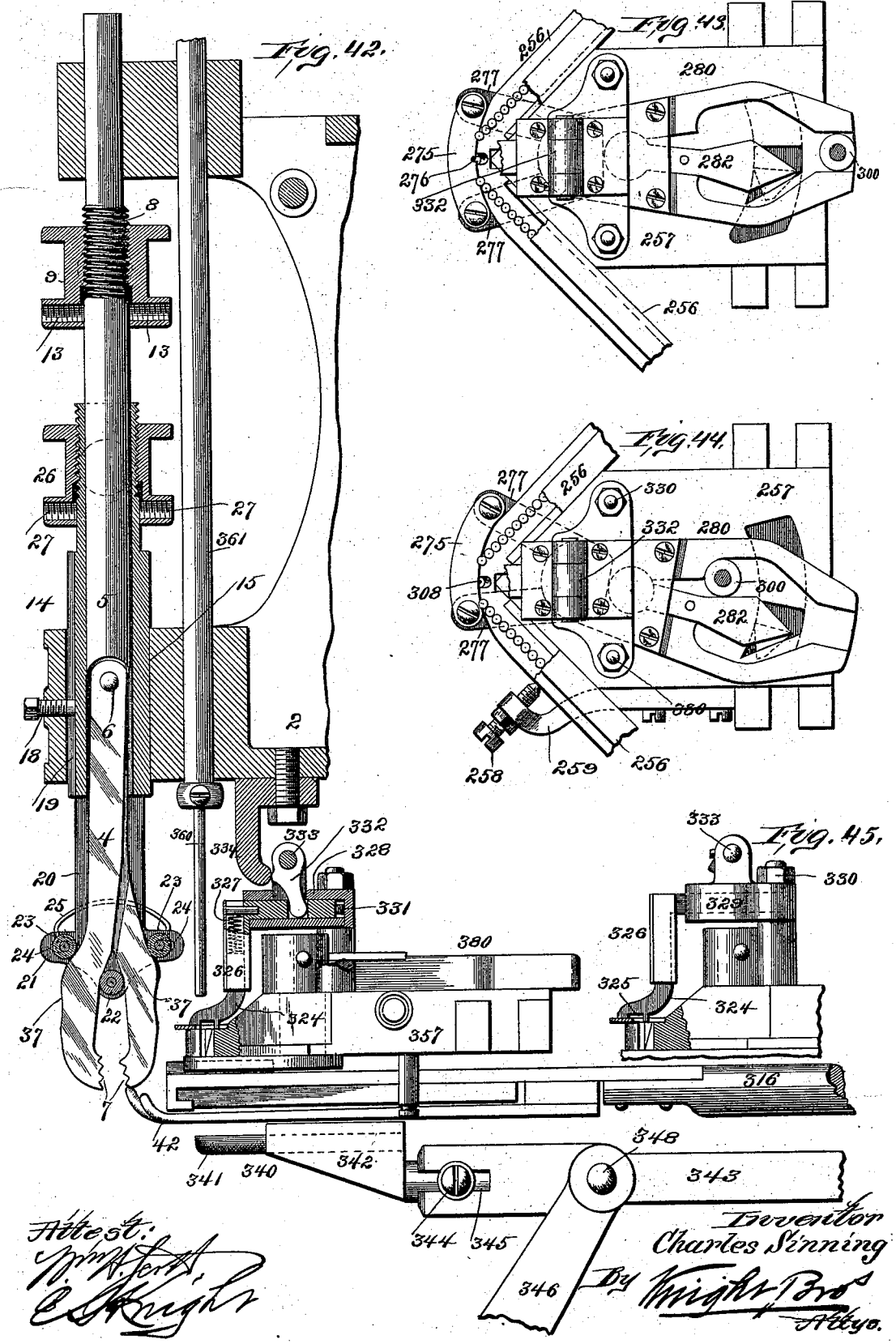

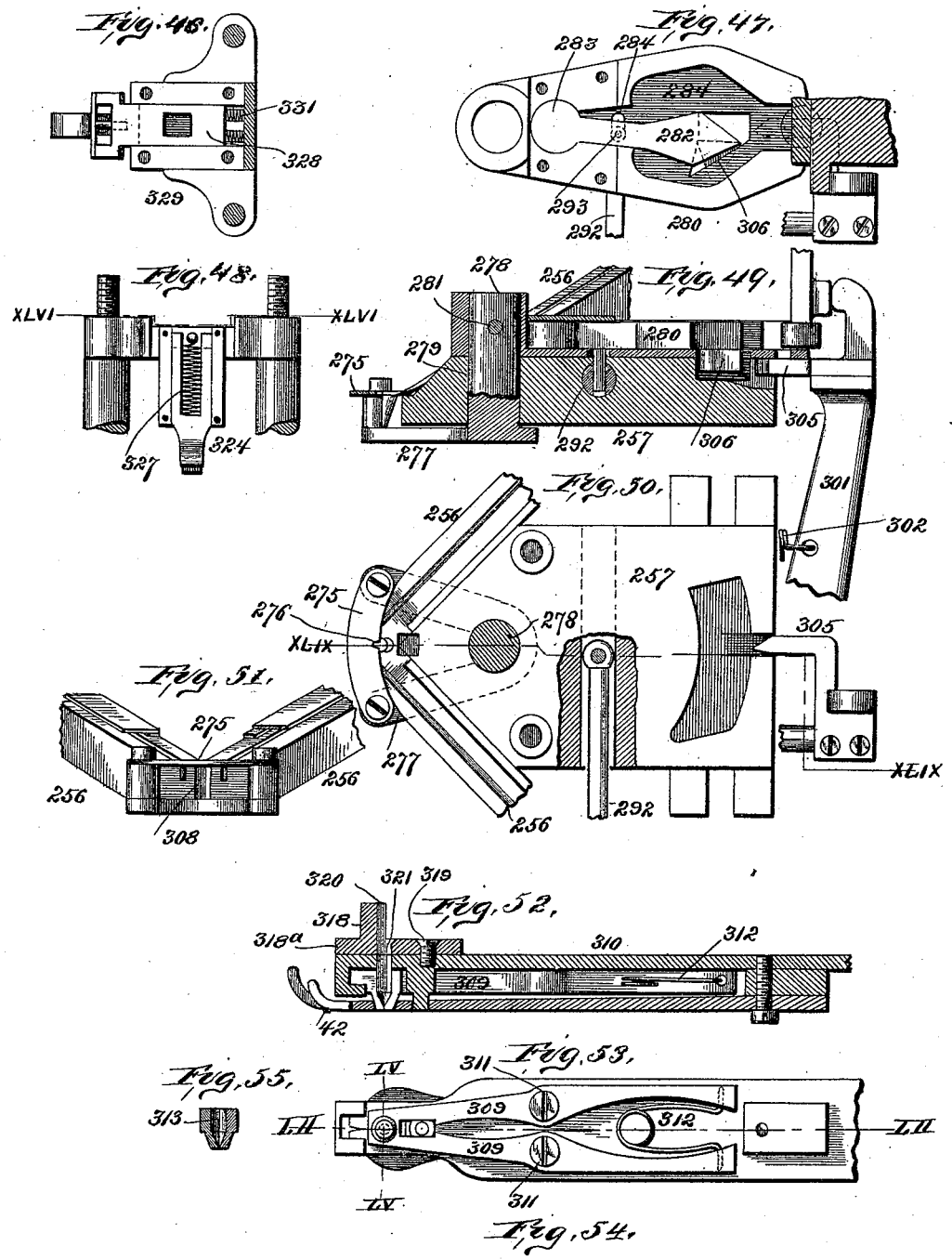

(No Model.) 16 Sheets—Sheet 14.
C. SINNING.
LASTING MACHINE.
No. 518,932. Patented Apr. 24, 1894.
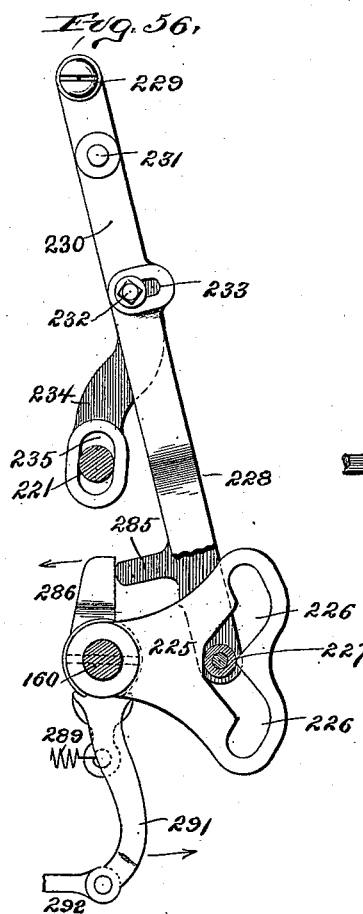
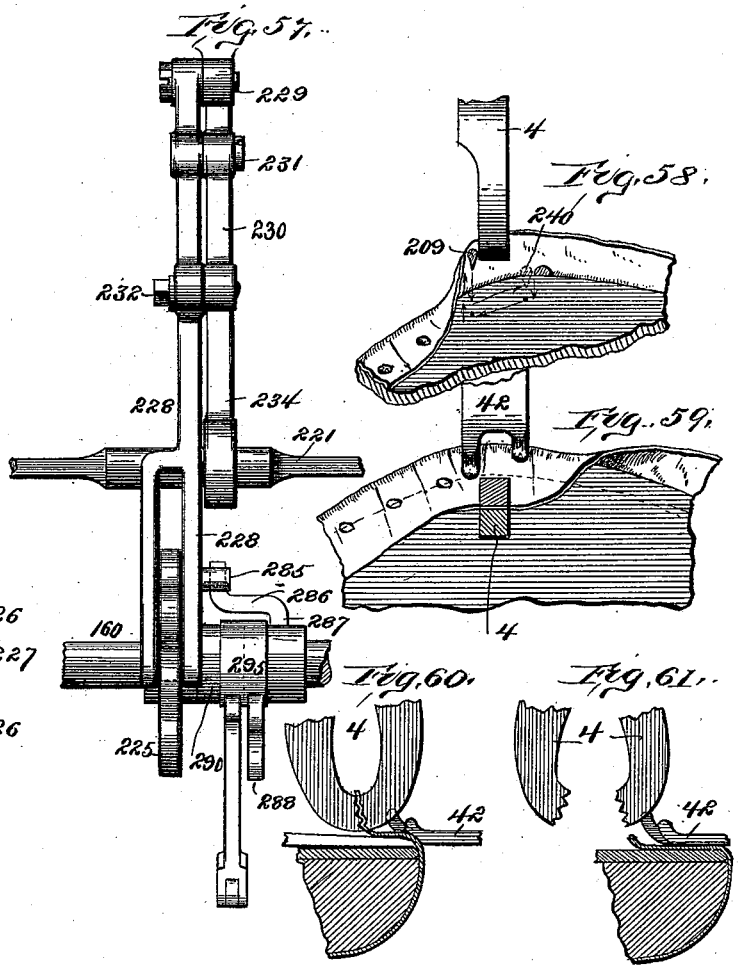
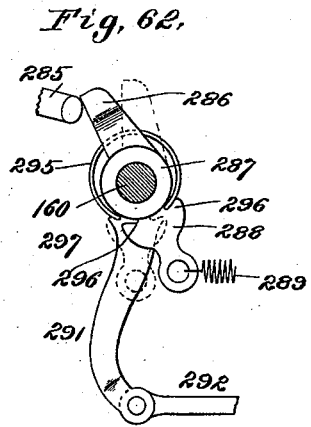
Inventor
Charles Sinning

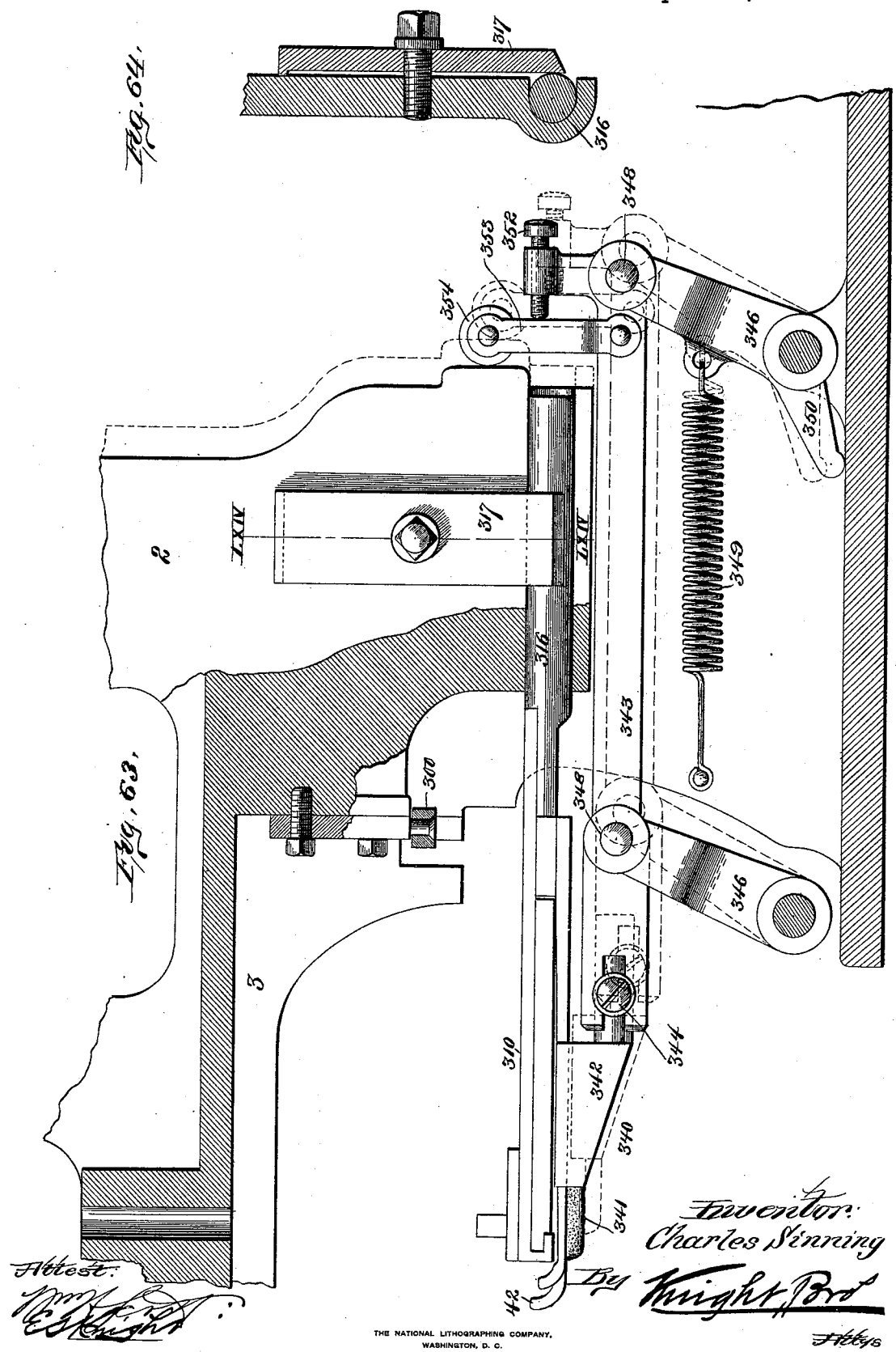

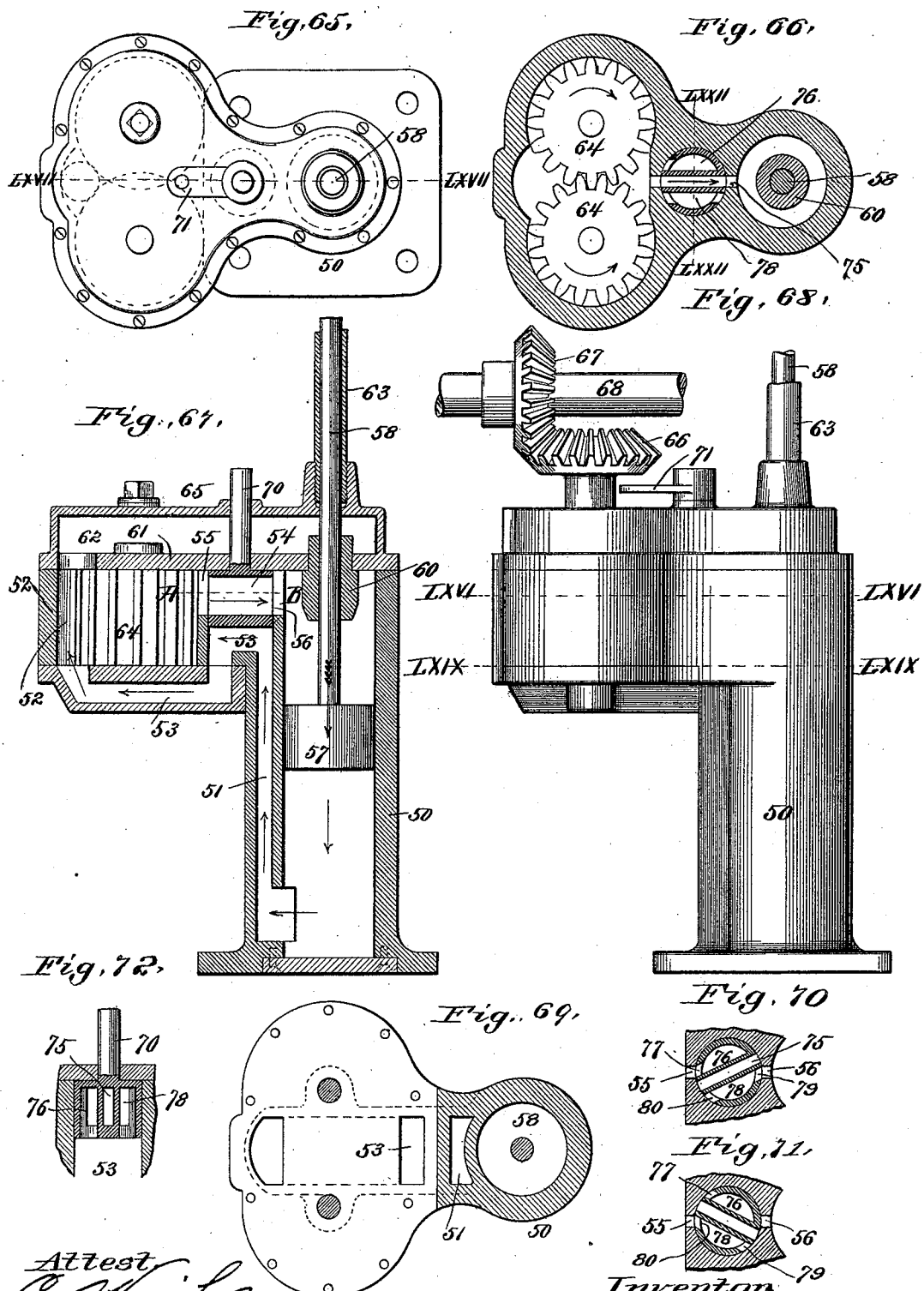

UNITED STATES PATENT OFFICE.

CHARLES SINNING, OF ST. LOUIS, MISSOURI, ASSIGNOR TO THE SINNING LASTING MACHINE COMPANY, OF EAST ST. LOUIS, ILLINOIS.

LASTING-MACHINE.

SPECIFICATION forming part of Letters Patent No. 518,932, dated April 24, 1894.

Application filed June 27, 1893. Serial No. 478,991. (No model.)

*To all whom it may concern:*

Be it known that I, CHARLES SINNING, of the city of St. Louis, in the State of Missouri, have invented a certain new and useful Improvement in Lasting-Machines, of which the following is a full, clear, and exact description, reference being had to the accompanying drawings, forming part of this specification.

My invention relates to certain improvements in lasting machines, of the general class of the machine shown and described in a number of patents already issued to myself, and to my assignee, the Sinning Lasting Machine Company, and I would refer particularly to Patent No. 456,225, dated July 21, 1891.

My present invention consists in features of novelty hereinafter fully described and pointed out in the claims.

Figure 1 is an elevation illustrative of my improved machine, looking at the machine from the right-hand side. Fig. 2 is a similar view, looking at the machine from the left hand side, with part of the frame of the machine broken away. Fig. 2ª is a view of one of the feed cams. Fig. 3 is a rear elevation of the machine, with the lower part of the frame broken away. Fig. 4 is a horizontal section, taken on line IV—IV, Fig. 1; the parts beneath the section line being shown in top or plan view. Figs. 5, 6, 7 and 8 illustrate the movement of the feed point; Fig. 5 shows the point in its first position; Fig. 6 in its second position, or in its upper position; Fig. 7 shows the point in its third, or lower position; and Fig. 8 shows the point in its fourth or normal position. Fig. 9 is a diagram, illustrating the movement of the point. Fig. 10 is a front elevation of the head of the machine. Fig. 11 is a section through the center of one of the tack boxes. Fig. 12 is a section through the head of the brush located in the tack box, and showing the brush in edge view. Fig. 13 is a section taken on line XIII—XIII, Fig. 11. Fig. 14 is an enlarged, transverse section, taken on line XIV—XIV, Fig. 15. Fig. 14ª is a longitudinal section of the race-way from which the tacks move from the box to the point of use. Fig. 15 is a side elevation of the race-way. Fig. 16 is an enlarged, transverse section taken on line XVI—XVI, Fig. 15. Fig. 17 is a side view of the machine, part of the working mechanism being removed. Fig. 18 is an enlarged, detail section, taken on line XVIII—XVIII, Fig. 36, also in a plane parallel to the plane of Fig. 17 and showing the parts operated by the treadle. Fig. 19 is a vertical section of the head of the machine, with parts removed. Fig. 20 is a side view of the clutch. Fig. 21 is part in elevation, and part in section on line XXI—XXI, Fig. 20, showing the clutch engaged. Fig. 22 is a similar view showing the clutch disengaged, and parts in changed positions. Fig. 23 is a similar view showing the clutch engaged. Fig. 24 is a top view of the supporting lever for the bell-crank of the clutch. Fig. 25 is a top view of the bell-crank lever of the clutch. Fig. 26 is a section taken on line XXVI—XXVI, Fig. 21. Fig. 27 is a section taken on line XXVII—XXVII, Fig. 28, and illustrating a modification of the clutch of the machine. Fig. 28 is a vertical section taken on line XXVIII—XXVIII, Fig. 4, the fly-wheel being omitted. Fig. 29 is a side elevation illustrating the sliding frame and cams for moving the frame; the stationary frame being in section. Fig. 30 is an elevation of the adjustable closing cam. Fig. 31 is an elevation of the closing cam. Fig. 32 is an elevation of the opening cam. Fig. 33 is an edge view of the cams. Fig. 34 is a section, taken on line XXXIV—XXXIV, Fig. 30. Fig. 35 is a section taken on line XXXV—XXXV, Fig. 30. Fig. 36 is a horizontal section, taken on line XXXVI—XXXVI, Fig. 17. Fig. 37 is a front elevation of the catch for the starting lever. Fig. 38 is a section of the closing cam and shaft, taken on line XXXVIII—XXXVIII, Fig. 28, and showing the fork for moving the cam in edge view. Figs. 39 and 40 are detail views showing the fork in different positions. Fig. 41 is an edge view of the escapement disk. Fig. 41ª is a side elevation of the escapement. Fig. 42 is an enlarged, vertical section of part of the machine, showing the pinchers, the support for the pinchers, and part of the tack mechanism, and also part of the pusher. Fig. 43 is a top or plan view of the tack switch. Fig. 44 is a similar view, showing the parts in a different position. Fig. 45 is a side view or elevation, showing part of the tack switch. Fig. 46 is a top view of the support of the tack distributer showing the top plate and bolts in section on line XLVI—XLVI, Fig. 48. Fig. 47 is a top view of the tack switch, with part of the frame in section. Fig. 48 is a detail, front view of the tack distributer. Fig. 49 is a vertical section, taken on line XLIX—XLIX, Fig. 50. Fig. 50 is a top or plan view of the switch support with the switch removed, showing part of the raceways, and showing the switch controller in top view. Fig. 51 is an enlarged, detail, perspective view of the front end of the raceways. Fig. 52 is a vertical section, taken on line LII—LII, Fig. 53. Fig. 53 is a bottom view of the tack holder. Fig. 54 is a bottom view of the folder. Fig. 55 is a section of the tack holder jaws, taken on line LV—LV, Fig. 53. Fig. 56 is an elevation or side view of the cam and lever for changing the tacks and feed. Fig. 57 is an edge view of same. Fig. 58 is a detail, perspective view, showing the pinchers engaging the shoe-upper. Fig. 59 is a top view of the shoe-upper showing the pinchers in section and the folder engaging the edge of the last. Fig. 60 is a side view, showing the lower edge of the pinchers engaging the upper and showing the edge of the forward end of the folder, and the last in section. Fig. 61 is a detail view, showing the pinchers open and the folder advanced to its forward position; the portion of the last and upper being in section. Fig. 62 is an elevation of the levers for changing the tacks; the shaft of the levers being in section. Fig. 63 is an elevation of the pusher and tack holder; the pusher being shown in different views by full and dotted lines. Fig. 64 is a section taken on line LXIV—LXIV, Fig. 63. Fig. 65 is a top view of the pump. Fig. 66 is a horizontal section of the pump, taken on line LXVI—XLVI, Fig. 68. Fig. 67 is a vertical section of the pump, taken on line LXVII—LXVII, Fig. 65. Fig. 68 is an elevation of the pump. Fig. 69 is a horizontal section, taken on line LXIX—LXIX, Fig. 68. Figs. 70 and 71 are horizontal sections of the valve, taken on line A—B, Fig. 67. Fig. 72 is a section of the valve taken on line LXXII—LXXII, Fig. 66.

Referring to the drawings:—1 represents the main frame of the machine, upon which is mounted the movable head 2, and a fixed head 3, as in some of my former patents.

4 represents the nippers consisting of a pair of bars pivoted to a spindle or shaft 5, at 6, and having their lower ends serrated, as shown at 7, so that they will take a firm bite upon the leather to draw it into position over the last see (Fig. 42.) In my present construction the spindle 5 is threaded at 8, to receive a grooved collar 9, that fits the forked end of a lever 10, which is pivoted at 11 to the movable head 2, (see Figs. 1, 2, 4, 19 and 42.) The end of the lever at the collar 9, is forked to fit in the groove of the collar, as shown at 12, Fig. 4. As the lever 10 is oscillated on its pivot 11, it will impart a vertical movement to the spindle 5, and through the spindle will cause a vertical movement to the nippers 4. The collar 9 has a threaded connection with the spindle 5, as stated, and it is provided with means for turning it so that its vertical position on the spindle can be changed to regulate the rise and fall of the nippers under the action of the lever 10, as, for instance, if the collar is moved upwardly on the spindle, the nippers will be moved to a lower point, and not ascend as high, and by moving the collar down on the spindle, the nippers will not descend as low, and will ascend to a higher point. The distance of movement of the nippers will be the same in each case, but the points to which they move will be different. As a means for turning the collar 9, I have shown it provided with sockets 13 (Fig. 42,) into which a key or short lever can be inserted.

14 represents a sleeve fitting the spindle 5 and having a loose bearing at 15 in the head 3. The sleeve 14 is adapted to move vertically with relation to, and independent of the spindle 5, and it is thus moved by means of a lever 16 pivoted to the head 2 at 17, (see Fig. 19.) While the sleeve is permitted to move vertically, it is held from horizontal movement or rotation by means of a set screw 18 passing through the bearing 15 and fitting in a groove 19 of the sleeve. The sleeve has downwardly extending arms or extensions 20, upon the lower ends of which is a head 21, provided with a fixed central roller 22, and movable lateral rollers 23. The gudgeons or journals of the rollers 23 fit in slots 24 in the head 21, and these rollers are held against the outer surface of the pinchers by means of springs 25, (see Figs. 19 and 42.) The jaws of the nippers extend beneath the head 21 and extend through the head, as shown in Fig. 42. The central roller 22 is between the jaws. When the nippers are ready to take the leather, the sleeve 14 descends, carrying the head 21 with it, and the jaws are closed by the rollers 23 bearing against the outer surface of the nippers, and to provide for a positive movement of the sleeve 14, without danger of breaking any part of the machinery, I mount the rollers 23 in the slots 24 of the head 21 and provide the springs 25, which tend to keep the rollers in their inner position, but which will permit them to yield under excessive pressure, and thus different thicknesses of leather may be grasped by the nippers without danger of breakage even though the sleeve is moved by a positive action. When the sleeve ascends relatively to the spindle 5, the roller 22 serves to open the jaws of the nippers. It will be seen that the nippers will not be permitted to turn horizontally, from the fact that they are themselves flat or non-circular and pass through the flat head 21, which is formed upon or secured to the sleeve 14 that is held from turning by the set screw 18. The end of the lever 16 is bifurcated and fits in the groove of a collar 26 threaded on the upper end of the sleeve 14. The collar 26 can be adjusted to regulate the movement of the sleeve, and I have shown it provided with sockets 27, to receive a lever or tool by which it can be turned. The sockets 27 of the collar 26, and also the sockets 13 of the collar 9 are threaded, as shown in Fig. 42, so that when the collars have been adjusted respectively on the sleeve 14, and spindle 5, they may be held to their adjustment by means of set screws 28, fitted in the sockets, (see Figs. 1 and 42.) Each collar is provided with a number of the sockets to receive the lever for turning the collars, (the lever being inserted in the socket most accessible at the time,) and the set screw fits in one of these sockets. The lever 10 is moved on its pivot 11, to operate the spindle 5, by means of a cam 29, shown clearly in Figs. 4 and 19, the lever having a projection or cam roller 30, bearing against the cam and held against the cam during the first part of the movement of the cam, by means of a spring 31 connecting with a pump, which will be hereinafter particularly referred to. The cam 29 is mounted on a shaft 32 and as it moves against the projection 30 to a point substantially at A, Fig. 19, it causes the descent of the spindle 5, which lowers the nippers to a position to grasp the leather. As the cam 29 continues to turn against the projection 30, from the point A to the point B, the spindle remains in its lower position, and as the cam continues to move beneath the projection 30, from the point B, the spindle begins to rise under the influence of the spring 31, and it is now that the leather is being pulled in an upwardly direction by the nippers. When the nippers are in their lower position and before they commence to rise, the jaws of the nippers are caused to close by means of the lever 16, (which moves the sleeve 14 as explained.) The lever is operated by cams 33, 34, on the shaft 32, (see Figs. 19 and 30 to 35.) The cam 33 has a groove 35 in which a projection 36 (which is preferably in the form of a friction roller) on lever 16 fits, and the outer surface of this cam groove, from C to D, Fig. 19, is what causes the movement of the lever 16 to effect the descent of the sleeve 14; this portion from C to D comes against the projection 36 of the lever 16, while the projection 30 of the lever 10 is riding on the cam 29 from A to B. As soon as the point D leaves the projection 36, the lever 16 becomes inoperative, and the sleeve 14 is raised, with the spindle 5, by the lever 10, as the cam 29 from B to E moves under the projection 30 of the lever, the cam not acting to produce the descent of the outer end of the lever, but simply to effect or cause its gradual descent under the action of the spring 31, which pulls the projection 30 onto the surface of the cam from the point B to E, and the descent of this end of the lever is accompanied, of course, by the ascent of the other end of the lever and the spindle 5. As the spindle 5 ascends the jaws of the nippers continue to hold the leather, and draw it over the last. I have stated that the lever 16 is inoperative during the ascent of the spindle, but nevertheless the sleeve 14 continues to hold the jaws of the nippers in their closed position, although the sleeve, (during the ascent of the spindle) is not under the pressure of the lever 16. The sleeve thus acts to hold the jaws closed, although the pressure is removed from the lever 16, owing to the fact that the outer faces of the jaws are formed with substantially vertical portions or parallel faces 37, (see Fig. 42,) against which the rollers 23 bear when the sleeve 14 has been forced to its lower position, relatively to the spindle 5, and thus it will be understood that although the pressure of the lever 16 is removed from the sleeve 14, the rollers 23 will continue to hold the jaws of the nippers or pinchers closed until the sleeve 14 is raised, by a positive movement, relatively to the spindle 5. The lever 16 being thrown out of operation, after it causes the descent of the sleeve 14, leaves the lever 10 to lift the spindle 5 and sleeve 14 together, or at the same time. When the cam 29, at the point E, leaves the projection 30 of the lever 10, it ceases to operate on the lever, and the head 2 now begins to move forward to draw or pull the leather over the sole of the last. This forward movement of the head 2 is effected, (see Fig. 29,) by means of a cam 38 on the shaft 32, which bears against a projection 39, (which is preferably in the form of a friction roller,) extending from an arm 40 secured to the head 2, as shown. Almost immediately after the head 2 commences to move forward, the abrupt surface 41 of the cam 34 comes against the projection 36 of the lever 16, and causes the sleeve 14 to be raised on the spindle 5, and the jaws of the nippers are thus opened and release the leather, which is now forced down onto the last, as the head 2 continues to move forward, by means of a folder 42, (see Figs. 19 and 42.) The cam 34 may be mounted fixedly upon the shaft 32 as shown in Fig. 19 but for the purpose of causing the nippers to release the leather sooner or later, I prefer to secure the cam 34 adjustably on the hub 43 of the cam 33; the cam 34 having a collar 44 fitting over the hub, and which is tightened by a suitable clamp 45, see Fig. 30. The cam 33 has a gap 33ª, (see Fig. 31,) which is filled by the body of the cam 34, with sufficient play to permit the cam 34 to be adjusted, as stated. The periphery of the cam 34 has a rim 34ª, forming a continuation of the outer wall of the groove 35 in the cam 33, and the ends of rim 34ª are notched to overlap the notched ends of the rim on the cam 33, as shown at 46, Fig. 33, and thus the outer wall of the groove 35 is continuous across both cams. The face of the cam 33 has a recess 47 to receive the surface or part 41 of the cam 34. When the head 3 has returned to its inner position, the cam 29 comes against the projection 30 again, as shown at 48, Fig. 19, and the operation of the levers 10 and 16, with their parts, is repeated. While the head is in its forward position, the tacks are delivered and driven as will be hereinafter explained.

I will now describe the construction of the pump by which the projection 30 of the lever 10 is held toward the periphery of the cam 29 from B to E. This part of my present invention relates to an improvement upon my patent, No. 458,920, issued September 1, 1891. The object of my present invention, in this respect, is to simplify the construction, prevent leakage, and to make the pump more sensitive and quick in its action.

I do not herein claim improvements in the pump, as the same constitute the subject of my application filed November 4, 1893, Serial No. 489,997.

The construction of the pump is shown in the drawings from Figs. 65 to 72, and its connection with the machine is shown in Fig. 17, while the manner of driving it from the main shaft of the machine is shown in Figs. 3 and 17. 50 represents the cylinder of the pump having a port 51 forming a communication between its bottom and a chamber 52 located at the upper end of the cylinder. The port 51 communicates with the chamber 52 through means of a horizontal passage 53. 54 represents a valve located between the upper end of the cylinder and the chamber 52, the chamber having an opening 55 opposite the valve, and the cylinder having an opening 56 opposite the valve. 57 represents the piston of the pump, and the stem 58 of the piston is connected to the spring 31 above referred to, as shown at 59, Fig. 17. 60 represents a bushing fitting in the upper head of the cylinder, and extending a distance into the cylinder, as shown so as to prevent any possibility of the piston rising so far as to cut off the opening 56. The upper head of the cylinder and the top of the chamber 52, is formed by the bottom 61 of a chamber 62, located over the cylinder and over the chamber 52. The piston rod 58 passes through this chamber 62, as shown in Fig. 67, and on top of the chamber 62 is a tube 63 through which the piston rod also passes. The internal diameter of the tube 63 is somewhat larger than the diameter of the piston rod, so that any liquid carried up by the piston rod will travel down it again, and be caught by the tube, and carried back into the chamber 62, or in other words, by making the tube 63 larger than the piston rod, its upper end does not scrape or remove the liquid from the piston rod, but such liquid as is carried up on the rod gravitates back into the chamber 62. 64 represents the pump wheels of the pump, located in the chamber 52, and which force or conduct the oil to the valve 54, the wheels turning in the direction of the arrows, Fig. 66, and the spaces between the teeth being filled with oil, while such spaces at the adjacent sides of the wheels are occupied by the teeth of the wheels, and the oil thus displaced at the valve side of the wheels, as will be plainly seen.

One end of the journals or arbors of one of the wheels is extended through the top 65 of the chamber 62, and has upon it a bevel wheel 66 engaged by a similar wheel 67 on a shaft 68, journaled to the lower end of the frame 1 of the machine, and which is driven by a belt applied to a pulley 69 from a suitable motive power, (see Fig. 3.) The stem 70 of the valve 54 extends through the top 65 of the chamber 62, (see Fig. 67,) and has upon it a crank 71, (see Fig. 68,) which is connected to a treadle 72 by means of a bracket or standard 73, and a link 74, (see Fig. 17.) The form of the valve 54 is illustrated in Figs. 67, 70, 71 and 72. It has a straight passage 75 which forms a communication between the chamber 52 and the upper end of the cylinder 50. On one side of the passage 75 is a vertical passage 76, communicating through an opening 77 with the chamber 52, when the valve is turned in the proper position for this communication. The lower end of the passage 76 communicates with the passage or port 53, as shown in Fig. 72. On the other side of the passage 75 is a passage 78, which also communicates with the port 53 at bottom, and which has an opening 79 adapted to register with the opening 56 in the upper end of the cylinder 50, and an opening 80 adapted to register with the opening 55 from the chamber 52. When the valve is in the position shown in Fig. 67, the liquid passes from the chamber 52 into the upper end of the cylinder 50, above the piston 57. When the valve is in the position shown in Fig. 70, the liquid passes from the chamber 52 into the port 53, and of course back again into the chamber 52, and at this time the liquid is also allowed to pass from the upper end of the cylinder into the chamber 52, through the passage 53, thus allowing the piston 57 to be drawn up by the spring 31. When the piston is in the position shown in Fig. 71, the liquid is permitted to pass from the chamber 52 into the port 53, and back to the chamber, while the liquid is not allowed to escape from the upper end of the cylinder, the piston 57 at this time being held against the tension of the spring 31 by the body of liquid above it. When the valve is in the position shown in Fig. 67, the piston 57 is, of course, under the influence of the action of the wheel 64, but when the valve is in either of the positions shown in Figs. 70 or 71, the action of the wheels 64 does not affect or act upon the piston 57, and thus the pump is allowed to run continuously, whatever the desired condition of the piston 57 may be. The different positions of the valve 54 are effected by the operator, through the treadle 72, and he can effect, at will, a downward movement of the piston 57, (by moving the valve to the position shown in Fig. 67,) or permit an upward movement of the piston 57, (by moving the valve to the position shown in Fig. 70,) or he can cause the piston 57 to remain at rest, (by moving the valve to the position shown in Fig. 71.) By locating the chamber 52 at the upper end of the cylinder 50, with but the small space occupied by the valve 54 between them, the different actions of the piston 57 occur almost simultaneously with the movement of the valve 54. The chamber 62 provides a reservoir for surplus liquid, and the tube 63 communicating with the chamber 62 avoids any escape of liquid from the pump. In practice, the chamber 62 is kept about half filled with liquid, while the parts beneath are, of course, all full of liquid.

In operating the machine, the operator applies his foot to the treadle 72. The first movement of the treadle (the pump being in operation), shifts the valve 54 to the position shown in Fig. 67, causing the descent of the piston 57, and through means of a dial on the front part of the machine, the operator is informed of the tension upon the spring 31, caused by the descent of the piston 57. He then forces the treadle 72 to its lowest position, the first movement just referred to being about half of the throw of the treadle. As a means of indicating to the operator that he has moved the treadle the first half of its throw, I employ a treadle controller consisting of a rod 81, (see Fig. 17,) which passes through an arm 82 projecting from the frame 1. Between the arm 82 and a collar 83 on the upper end of the rod is a spiral spring 84, and on the rod, beneath the arm, is a collar 85. On the lower end of the rod, beneath the treadle 72, is a nut or collar 86, between which and the treadle, when the latter is in its upper position, there is a space, as shown in Fig. 17. The treadle is held in its upper or normal position by means of a suitable spring 87, see Fig. 17, or by means of a weight 87ª, see Fig. 36. When the operator depresses the treadle until it comes against the nut or collar 86, he feels the resistance of the spring 84, and is thus informed that he has moved the treadle sufficiently far to open a communication between the chamber 52 and the cylinder 50 of the pump. He then allows the parts to remain for a second, until the indicator shows the desired pressure; he then forces the treadle all the way down, and in doing so a projection or lug 88 of the treadle, (see Fig. 18) comes against a cross bar or projection 89 on a lever 90, pivoted to the frame 1, with the treadle, at 91. The lug 88 comes against the projection 89 before the treadle reaches the limit of its downward movement, and the lever 90 is carried down with the treadle, and throws the machine into operation through means of a clutch hereinafter to be described, the lever being connected to the clutch through means of a rod 92. When the lever reaches the limit of its downward movement, a bar 93 hinged to the frame 1, at 94, is pulled by a spring 95 into a notch 96 in the free end of the lever 90, and this bar holds the lever 90 in its lower position while the treadle 72 is permitted to vibrate to effect the different conditions of the pump, as explained. When it is desired to release the clutch and stop the machine, the operator presses against a foot-piece 97 on the bar 93, and forces the lower end of the bar out of the notch 96, permitting the lever 90 to rise and the clutch to be thrown out, and when the operator removes his foot from the treadle, it is drawn back by the spring 87 to its normal position shown in Figs. 17 and 18, when the valve 54 assumes the position shown in Fig. 70. It will be noted, by referring to Fig. 19 that from the point B of the cam 29, the periphery of the cam recedes toward the center of the shaft 32, and as already stated, it is at this time that the leather is being drawn over the last, and at this time the cam may or may not bear against the projection 30 of the lever 10, according to the tension of the spring 31, applied by the pump. Ordinarily the cam at this time does not bear against the projection 30, but leaves the lever 10 under the control of the tension of the spring 31. Some leathers require more pressure or require to be drawn harder or with more force than other leathers, and the operator has this entirely under his control by increasing or decreasing the tension of the spring, or holding it at a uniform tension through means of the pump which he controls and manages by the treadle, as explained, so that while the nippers are forced to their lower position, and held there a short time by a positive movement, while the cam is passing under the projection 30 to B, from here on, the ascent of the nippers is entirely under the control of the operator through the medium of the pump. The upper end of the piston rod 58 has a cross-head 100, (see Fig. 3.)

101 represents a shaft secured to the frame 1 of the machine by means of journal boxes 102. On this shaft is a crank 103, connected to one end of the cross-head 100 by means of a rod 104. On the shaft 100 is also an eccentric 105, (see Figs. 3 and 17) around which passes a strap 106, from which extends vertically a rod 107. This rod is forked at its upper end, as shown in Figs. 1 and 3, to receive the free end of the lever 10, the rod being held from movement endwise on the lever by means of pins 108. The arrangement of these parts is such that when the piston 57 descends, the salient part of the eccentric 105 turns downwardly and consequently the rod 107 falls with the piston, and when the piston ascends, the salient part of the cam turns upwardly, and the rod 107 ascends. The function of these parts is to form a stop for the outer end of the lever 10, and consequently for the upward pull of the nippers on the leather, and the stop thus formed is constantly shifting in accord with the tension of the spring. The outer end of the lever 10 can at no time descend farther or be pulled down farther by the spring 31 than the base or bottom of the crotch of the fork of the rod 107.

In lasting certain kinds of shoes, the leather has to be pulled up more with the nippers than with other kinds of shoes, and some leathers will stand considerable stretching, while others will stand much less. By providing the rod 107, the operator regulates the tension of the spring 31, and simultaneously shifts the rod 107, and if the tension of the spring 31 is greater than the leather will stand, there would be danger of tearing the leather were there not a limit to the downward movement of the outer end of the lever 10, or in other words, a limit to the upward movement of the nippers. This construction provides a stop to limit the movement of the nippers, and the stop is constantly changing with the position of the piston of the pump and the consequent tension of the spring 31.

I do not herein claim this clutch, as the same constitutes the subject-matter of my application filed November 4, 1893, Serial No. 489,996.

I will now describe the construction of the clutch arrangement, which is operated through means of the treadle 72, lever 90, and rod 92, as heretofore mentioned. This clutch arrangement is shown in the drawings, in Figs. 20 to 28 inclusive, and its application to the machine is shown in Figs. 2 and 3. The form shown in Figs. 2, 3, 27 and 28 differs somewhat from the form shown in Figs. 20 to 25 inclusive. I will first describe the latter form. The rod 92 is connected to one end of a bell-crank lever 110, which is pivoted at 111 to the frame of the machine. The end of the lever which does not have connection with the rod 92, is pivoted at 112 to a link 113; this end of the bell-crank lever and the link forming a kind of toggle. The upper end of the link is connected by a bolt 114, and a bar or second link 115 to the inner end of a bar or link 116, the outer end of the bar or link 116 being pivoted at 117 to the frame of the machine. The link 115 is connected to the link 116 by means of a bolt or pin 118. 119 represents a bell-crank lever pivoted to the inner end of the link 116 by means of the pin 118. One end of this bell crank lever is bifurcated, or forked, to fit in the groove 120 of the hub 121 of the clutch 122. The other end of the bell crank lever 119 is provided with a friction roller 123, adapted to be engaged by a cam 124 secured to the shaft 32 upon which is also mounted the recessed pulley 125, with which the clutch engages. 110ª represents a spring connecting the joint between the upper end of the bell crank lever 110 and the link 113 to the frame of the machine, as shown in Fig. 20. The pulley 125 has a conical or tapering recess to receive the clutch 122, as shown in Fig. 28. The end of the shaft 32 is recessed to receive a spring 126, (see Fig. 28,) which has bearing between a collar 127, tapped into the outer end of the shaft, and a head 128 on the inner end of a rod 128ª fitting in the hollow part of the shaft. The head 128 bears against a pin 129, fitting in slots 130 in the shaft, at its hollow part, the outer ends of said pin fitting in perforations in the hub of the clutch 122, one end of the pin being shown at 131, Fig. 22. When the lever 90 is depressed and held in its lower position by the bar 93, (which is the time the machine is working,) the bell-crank lever 119 is pulled down into the position shown in Fig. 23, so that the outer end of the lever cannot be engaged by the cam 124, as the shaft revolves; and at this time the clutch is held into frictional contact with the pulley 125 by means of the spring 126, the operating parts of the machine being now driven through the shaft 32, turned by the pulley 125, and the clutch 122; the clutch having feather and groove connection with the shaft, as shown in Fig. 28, while the pulley is loose on a collar 133, keyed to the shaft. The shaft 32 is driven by the pulley through the means of the clutch (when the clutch is in engagement with the pulley) by means of a belt 134, passing over the pulley and around a pulley 135 on the shaft 68, see Fig. 3. The tension of the spring 126 is sufficient to hold the clutch against the pulley 125, with sufficient force to insure the turning of the shaft 32 through means of the pulley and clutch. When the lever 90 is released, the spring 110ª draws the toggle formed by the upper end of the bell crank lever 110 and link 113 back into a straight line, as shown in Fig. 20, and the bell crank lever 119 is raised to its position shown in Fig. 21, and as soon as the cam 124 engages the outer end 123 of the lever 119, it will, by depressing this end of the lever, throw the clutch out of engagement with the pulley, the shaft 123 will stop turning, and the machine will be at rest while the pulley 125 continues to revolve. The form of the arm 116 is shown in Fig. 24, where it is illustrated as being double. The form of the bell crank lever 119 is shown in Fig. 25. For the purpose of applying a brake, and stopping the rotation of the shaft 32 simultaneously with the throwing out of the clutch, I form a ledge 136 on the clutch 122, and pivot a bar 137 to the frame of the machine at 138, see Fig. 20. The free end of this bar has a shoe 139. 140 represents a lever pivoted at 138, and which is located beneath the bar 137. The inner end of this lever is connected to the upper end of the link 113 by means of a pin 114, see Fig. 21. It will thus be seen that when the toggle is straightened, the inner ends of the lever 140 and bar 137 will be raised with the lever 119, and as the cam 124 throws the clutch out of engagement, the ledge 136 on the clutch comes against the shoe 139 on the bar 137, and thus the shaft 32 is brought to a stop or rest. 141 represents a set screw fitted in the end of the lever 140, and against which the inner end of the bar 137 rests. By adjusting this set screw, the wear of the shoe can be compensated for.

In the form of clutch shown in Figs. 3, 27, and 28, the clutch itself is the same as in the form just described, but instead of using the mechanism described for moving the clutch out of engagement with the pulley, I employ a vertical rod 142, having a collar 143, to which the rod or wire 92 is connected. The upper end of this rod 142 is adapted to fit in the groove 120 of the clutch, as shown in Fig. 27, or to be moved down out of engagement with the groove, as shown in Fig. 28. When it is moved down, the spring 126 forces the clutch into engagement with the pulley 125, and when the lever 90 is released, the rod is pulled up into the groove by means of a spring 144, (see Fig. 3,) the spring connecting the collar 143 to the frame of the machine. When the rod has entered the groove, a cam 145 in the groove of the clutch comes against the rod, and forces the clutch out of engagement with the pulley. In this form of the device, the brake shoe and lever are employed as in the other form; the shoe being moved by means of a bell-crank lever 147 pivoted to the frame at 148, one arm of which is connected to the lever of the brake by means of a link 149, while the other arm is connected to the rod 142 by means of a collar 150, (see Fig. 27.) Secured to the other end of the cross-head 100 from that at which the rod 104 is connected, is a rod 151 loosely secured to the frame of the machine by boxes or guides 152, (see Fig. 3.) The upper end of this rod 151 is connected by a link 153 to the crank 154 of a shaft or rod 155, supported in suitable brackets or arms 156 on the machine frame, (see Figs. 1, 2 and 3.) On the inner end of this rod 155 is the finger 157 of a dial 158, (see Figs. 2 and 10.) It is by this dial which is directly in front of the operator and in the line of vision, as he is looking at his work, that the tension of the spring 31 is indicated, and by looking at the dial the operator is informed of the action of the pump.

I will next proceed to describe the escapement device for shifting the side shaft of the machine, and which is illustrated in Figs. 1, 3, 4, 38, 41 and 41ª. This shaft is shifted, to vary the feed of the machine upon the last, and to regulate the length of tack delivered; as, for instance, a long feed and short tack is desired for the sides of the shoe; a short feed and long tack is desired for the toe of the shoe; and a short feed and long tack is desired for the heel of the shoe, and the different positions of the side shaft so varies the feed mechanism and the tack mechanism that the desired feed and length of tack are obtained at the proper time. 160 represents the side shaft referred to. It is supported at one end by an extension 161 of the frame, as shown in Figs. 1 and 41ª, at the other end the shaft is supported by means of a box 164 on the stationary head of the machine, see Fig. 1. At its inner end the shaft is provided with a crank 165, (see Figs. 3 and 28,) which is connected by a link 166 to a wrist-pin 167 on an escapement wheel 168, (see Figs. 1 and 3.) The escapement wheel is rigidly mounted on a shaft 162, which is supported in boxes 169, as shown in Figs. 3 and 28 and has upon it a loose pulley 170, which receives a driving belt 171, from a pulley 172 on the main or power shaft 68.

Referring to Fig. 28 173 is a fixed disk on the shaft 162, with a washer 174 between it and the pulley. 175 is a spring surrounding the shaft 162 between a fixed collar 176 and a movable collar 177. 178 represents a washer between the collar 177 and the hub of the pulley 170. The collar 176 is, as stated, fixed on the shaft 162, but it may be adjusted thereon by means of a set screw 179, to regulate the tension of the spring 175. The collar 177 is caused to turn with the shaft by means of a pin 180, fitting in a groove in the shaft which allows the collar to be forced endwise by the spring, so that the spring will act to force the loose pulley 170 against the fixed disk 173. When the shaft is not held from turning by the escapement, the friction between the pulley 170 and the disk 173 is sufficient to revolve the shaft, but when the shaft is held by the escapement, the pulley 170 runs without turning the shaft. The escapement wheel 168 has four projections 182, (see Fig. 41ª,) consisting, preferably of strips 183, set into the face of the wheel, and held in place by set screws 184, as shown in Figs. 41 and 41ª, and in front of these projections the periphery of the wheel is preferably notched, as shown at 185. 186 and 187 represent the arms of the escapement, which are pivoted at 189 to an extension 190 of the frame. The arm 186 has a square end 191, for engaging the projections 182, and it preferably has an end 192 for entering the notches 185. The end of the arm 187 is hooked, as shown at 193, for engaging the projections 182, and the face of the hook is preferably slightly inclined so that when the hook engages the projections, it will slip over them. 194 represents a bar or extension on the arms 187 and 186, and which is connected at 195 to one end of a bar 196, the other end of which is connected at 197, (see Fig. 1,) with a finger-piece 198, pivoted at 199 to the fixed head of the machine. When the arm 186 is in engagement with the escapement wheel, as shown in Fig. 41ª, the escapement wheel is held from turning, and at this time no motion is imparted to the side shaft 160. When the operator desires to shift the shaft, he presses with his hand against the lower end 200 of the finger-piece, and moves the arm 186 of the escapement out of engagement with the escapement wheel. The shaft 162 then commences to turn the escapement wheel, which imparts its movement to the side shaft 160. As the arm 186 is moved out of engagement with the escapement wheel, the hook of the arm 187 is moved into the path of the projections 182, so as to prevent any possibility of the escapement wheel turning more than one-fourth of a revolution in case the arm 186 should not come back against the periphery of the escapement wheel in time to receive the next projection 182. The operator is supposed to remove his hand from the finger-piece immediately after releasing the escapement, and the arm 186 is drawn back against the periphery of the escapement wheel by means of a spring 201, (see Figs. 1 and 41ª.) The operator thus has the rocking movement of the side shaft entirely under his control, so that he can shift it to produce a long feed and short tack, or a short feed and long tack. When the escapement is in the position shown in Figs. 1 and 41ª, a long feed and short tack is obtained for the side of the shoe; as the heel is reached, the operator trips the escapement, and the escapement wheel is moved to bring the wrist pin vertically over the shaft of the escapement wheel, at which time a short feed and long tack will be obtained; as he leaves the heel, the operator trips the escapement again, and the wrist-pin moves to the opposite side of the shaft of the escapement wheel to that shown in Fig. 41ª, and a long feed and short tack are obtained for the other side of the shoe. Then as the toe is reached, the operator trips the escapement again, and the wrist-pin moves vertically beneath the shaft, or center of the escapement wheel, and a short feed and long tack are again obtained for the toe, and then as the toe is left, the escapement is tripped again, bringing the wrist-pin back to the positions shown in Figs. 1 and 41ª for the side of the next shoe to be lasted. By providing the notches 185 and the end 192 on the arm 186, the escapement wheel is held from being turned backward, and consequently the shaft 160 from being shifted, when the machine, for any reason may be turned backward.

In lasting the heel of a shoe, the leather does not have to be drawn over or acted upon in any way by the nippers so that the nippers at this time must be inoperative and they are thrown out of operation by the side shaft 160, through means of a collar 160ª on the shaft, (see Figs. 38, 29 and 40,) which has a projection 160ᵇ adapted to engage a lug 160ᶜ on a lever 160ᵈ pivoted at 160ᵉ to the frame of the machine, (see Fig. 1,) and which is forked at its upper end, (see Fig. 38,) to engage the groove 160ᶠ in the hub of the cam 33. This cam has a feather and groove connection with its shaft 32, and when the side shaft is to give the short feed and long tack for the heel of the shoe, the projection 160ᵇ comes against the lug 160ᶜ and through means of the lever 160ᵈ pulls the cam 33 over so that it will not operate upon the lever 10 and thus the pinchers or nippers are not opened and closed while the heel is being lasted. As shown in Figs. 33 and 34, the cam 34 projects out farther than the face of the cam 33 and should the nippers be closed on the leather at the time the heel is reached, and the side shaft is shifted, this projection of the cam 34 will operate the lever 10 and open the pinchers, which will then remain open until the cam 33 (carrying the cam 34 with it) is shifted back again by the shifting again of the side shaft.

I will now proceed to describe the feed device, (by which is meant the mechanism for automatically moving the last to receive the tacks,) and the manner it is acted upon by the side shaft. 205 represents a vertical shaft or rod held and guided by projections or lugs 206, on the fixed head of the machine, see Fig. 2. On the lower end of this shaft is a crank head or arm 207, (see Figs. 1 and 10.) To the lower end of the head is secured a finger 208, turned inwardly toward the rear end of the machine, as shown in Fig. 1, and having a point 209. The finger is secured to the head 207 by means of a plate 210 and set screws 211 so that it may be adjusted on the head, if desired, (see Fig. 2.) On the shaft 205 is an upper collar 212, and a lower collar 213, between which fits one end of a bell crank lever 214, which is pivoted at 215 to the fixed head. The other end of the bell-crank lever is connected to a rod or bar 216 the inner end of which straddles the shaft 32, (see Fig. 2.) On the shaft 32 is a cam 217, adapted to engage a projection or roller 218 on the bar 216. As the shaft 32 is turned, the cam 217 will move the bar 216 endwise, and through means of the bell crank lever 214 will lift the rod or shaft 205 to raise and lower the finger 208. It is by this mechanism that the feed finger receives its vertical motion. The finger has also a reciprocating, horizontal movement, and this movement is imparted, through means of a cam 219 on the shaft 32, (see Figs. 1 and 2ª,) which engages a roller or projection 220 on the inner end of a rod or bar 221. The outer end of this bar has a socket fitting over a lever or arm 222 on the shaft or rod 205, (see Figs. 1, 4 and 10;) this lever or arm being secured to the shaft 205 by means of the upper collar 212, while the lower collar 213 is utilized for securing the head 207 to the bar or rod. 223 represents a spring connecting a pin 224 on the shaft 205, to the frame of the machine, (see Fig. 2.) The function of this spring is to take up any lost motion of the cam 219, and connections. It will be seen that as the shaft 32 revolves, a longitudinal movement will be imparted to the rod or bar 221, which will in turn impart a rotary movement to the shaft 205, and this movement of the shaft imparts a reciprocating horizontal movement to the point 209 of the finger 208. This reciprocating movement of the point is what feeds the last in the hands of the operator each time a tack is driven, and to get the variable feed heretofore referred to, the side shaft 160 is utilized. On the side shaft is a bracket 225, best shown in Fig. 56, while its location on the machine is shown in Figs. 1 and 10. The cam 225 has a double V-groove 226, in which fits a projection or roller 227 on the lower end of a lever 228, pivoted at 229 to the frame of the machine, the lower end of the lever being preferably bifurcated or forked, as shown in Fig. 57. 234 represents an arm pivoted at 231 to the lever 228, and connected to the lever below the pivot by means of a bolt 232 fitting in a slot 233, either in the lever or in the arm. The lower end of the arm is curved out of line with the lever 228, as shown at 234, Fig. 56, and has a slot 235 which receives the rod or bar 221. By the slot-and-pin connection 232, 233, the lower end of the arm may be shifted relatively to the lever 228. By adjusting the side shaft, through means of the escapement, as heretofore explained, the point 227 of the lever 228 is moved in or out, through means of the grooves 226 in the bracket 225, and this movement is imparted to the rod or bar 221, moving it in or out on the lever 222, thus causing the point 209 of the finger 208 to move a greater or less distance. When a long feed is desired, the side shaft is shifted to bring the bracket 225 into the position shown in Fig. 66, thus moving the rod or bar 221 inwardly on the lever 222; then when a short feed is desired, the side shaft is shifted so that the projection 227 will be at one end of the slot 226 in the bracket, thus moving the rod or bar 221 outwardly on the lever 222, and changing the leverage of the bar 221 of the shaft 205, and thus the different lengths of feed are acquired by simply shifting the side shaft 160. The form of the slot 226 in the bracket 225 will give the two short feeds for the toe and heel, while the projection 227 is in the ends of the slot 226, and will give the two long feeds for the sides of the shoe when the projection 227 is at the center or middle of the slot 226, and these adjustments come in the proper order or rotation, by the intermittent turning of the side shaft, through means of the intermittent quarter movement of the escapement wheel.

It is sometimes desirable to lengthen or shorten the feed, both for the sides and for the heel and toe, while the relative distance remains the same, and this is attained by shifting the arm 234 on the lever 228, through means of the slot and bolt connection 232, 233; the bolt, of course, being tightened after the adjustment is made.

To permit the outer end of the rod or bar 221 to be shifted in and out on the lever 222, I form a hinged joint in the bar, as shown at 238, (see Fig. 4,) and to permit of the vertical movement of the outer end of the rod or bar with the shaft 205, a hinged joint 239 is formed in the bar; these two hinges forming a universal joint.

The mechanisms just described for imparting the vertical and horizontal movement to the point 209 of the finger 208, are so disposed and arranged that the point describes a movement illustrated in Fig. 58. Supposing the point to be in its upper position, as shown in Fig. 58, it first descends, as illustrated by the arrow, then moves back to the position shown in dotted lines at 240, then descends into the last, then rests a moment until the tack is driven, then moves forward carrying the last with it, and then ascends again, lifting the leather with it, (it being now under the leather,) where it rests until the nippers come down and grasp the leather, and then the point moves down again, and the operation continues. It will be observed that when the point rises, it is between the last tack which has been driven, and the nippers, and this is important, for the reason that it holds the edge of the leather up well into position to be grasped by the nippers; and it holds the leather up much better than it would were it on the other side of the nippers, or were the nippers between it and the last tack driven.

The action or movement of the feeder point is illustrated in the diagram views, Figs. 5 to 9 inclusive, as well as in Fig. 58.

241 represents a guide against which the operator holds the last, subject to its movement by the feeder point. This guide is secured, as shown in Fig. 1, to the stationary head of the machine.

I will now describe the tack mechanism. 250 and 251 represent the tack boxes. They are supported by brackets 252 on the stationary head of the machine, (see Figs. 4 and 10,) and they are turned by belts 253, which pass over pulleys 254 on the shaft 32, and over guide rollers 255. 256 are the raceways extending from within the boxes, in a downwardly direction to a point near the center of the machine. The tack boxes are in substance the same as in my patent, No. 456,225, dated July 21, 1891. The raceways fit loosely, at their upper ends, in the openings in the tack boxes, and at their lower ends are loosely held against the block 257, (which corresponds to the block 368 of the last mentioned patent,) by means of conical pointed screws 258, (see Fig. 44), which pass through arms 259 secured to the block 257. The raceways are thus permitted to move slightly when they are tapped, and lodging of the tacks is guarded against. The raceways in this instance, as shown in Figs. 14 to 15 are composed each of a solid piece grooved all the way down, as shown at 260, see Figs. 14 and 14ª, for the escape of headless tacks, and grooved part way down, as shown at 261, Figs. 14ª and 15 for the passage of the tacks, while their heads ride along on the upper surface of the raceways. The raceways are covered each by a strip 262 resting at its ends on raised parts 263 on the top edges of the raceways and held thereon by a strap 264 secured thereto and to the race-way, (see Fig. 15.) By thus forming the race-ways and providing the strips 262, the tacks can be easily seen while they are not allowed to be jarred from the race-ways.

In my present invention the bristles of the brushes 265 are arranged to sweep across the upper ends of the race-ways within the boxes, as shown in Fig. 11, and the brushes are arranged so that they pass sidewise over the races instead of endwise, as shown in Fig. 49 of my patent last referred to. I thus get a better action of the brushes in sweeping the loose tacks from off the upper ends of the race-ways. The brushes are secured to short shafts 266, journaled in the sides of the boxes, and outside of the boxes the shafts are provided with stems 267 having heads 268 for striking and tapping the race-ways, the stems being moved in one direction by pins 269 on the outer face of the boxes, and in the other direction by springs 270, (see Figs. 10 and 11.) These stems are very similar to the corresponding stems of my patent referred to.

I will now describe the construction and operation of the mechanism for receiving the tacks from the race-ways, and delivering them to the point where they are driven into the last. The mechanism is shown in Figs. 42 to 54 of the drawings. 275 represents a tack carrying plate having a notch 276 into which the tacks move from the race-ways as the notch in the plate is brought opposite the grooves in the race-ways. This plate 275 is secured to a V-shaped support 277, secured to or formed upon the lower end of a pin 278, (see Figs. 49 and 50;) the pin fits in a hole or perforation 279 in the block 257. The block is secured to the movable head of the machine. To the pin 278, above the block 257, is rigidly secured a shoe 280. I have shown the shoe secured to the pin 278 by a cross pin 281. As the shoe is vibrated from side to side on the pin 278, it oscillates the plate 275 to bring the notch 276 in position to receive the tacks from the desired race-way. 282 represents a switch tongue pivoted to the shoe 280 at 283, the shoe being mortised out on its upper face, as shown at 284, to receive the free end of the switch tongue. The switch tongue is moved or shifted from side to side, to cause the shoe to be thrown in the desired direction, through means of the side shaft 160 and the lever 228. This is done through means of a projection or lug 285 on the lever, (see Fig. 56,) which engages an arm 286 loosely mounted on the shaft 160; the arm having a collar 287 surrounding the shaft, (as shown in Figs. 57 and 42.) The collar 287 has also a downwardly projecting arm 288 connected by a spring 289 to a fixed part of the machine. On the shaft 160 is another collar 290, having a depending arm 291, connected by a rod 292 to the switch point 282 by means of a pin 293, fitting in the slot 294, in the shoe 280. The slot permits the pin to move transversely of the shoe 280, so that the switch tongue can be thrown by the rod 292, (see Figs. 57 and 49.) The collars 287 and 290 are surrounded by a wide, flat spring 295, the ends of which fit in notches 296 in the arm 280, and also fit in notches 297 in the arm 291, (see Figs. 56, 57 and 62.) As the side shaft is rocked to bring the pin 227 of the lever 228 to the center of the cam bracket 255, the projection 285 of the lever presses against the arm 286, and forces it in the direction of the arrow, Fig. 56, and at the same time the lever 291 is forced in the direction of the arrow, through means of the spring 295, and thus the switch point 282 is drawn over into the position shown in Fig. 47. Then when the rock shaft moves the pin 227 of the lever 228 to the outer ends of the cam slots 226, the projection 285 leaves the arm 286, and the spring 289 draws the parts back to their normal position, the switch 282 being now moved to the other side through means of the pressure of the spring 289 acting on the lever 291, through means of the spring 295. This latter position of the arms 286, 288 and 291, and the spring 295, is shown by full lines in Fig. 62, while the other position of the parts is shown by dotted lines in this figure. 300 represents a projection, (preferably in the form of a friction roller,) which is secured to the fixed head of the machine, and which is adapted to enter the groove or mortise 284 in the upper face of the shoe 280, when the movable head recedes. This projection 300 enters one side or the other of the switch tongue 282, according to which side of the center of the shoe the switch tongue may have been shifted by the side shaft 160, as explained. As the projection enters the groove 284 it moves the shoe into the position shown in Fig. 44, to get a short tack, or if the switch tongue has been shifted so as to direct the projection into the groove on the other side of the switch tongue, then the shoe will be moved to the reversed or opposite position to that shown in Fig. 44, so as to receive a long tack. To prevent any possibility of the projection 300 striking centrally on the point of the switch tongue, I employ what I term a switch controller, and which is substantially the same as the corresponding device in my patent last referred to. (It is shown in Figs. 19, 47, 49 and 50.) It consists of an arm 301, pulled forwardly by a spring 302. The arm is pivoted at 303 to the fixed bed of the machine, and it has an upper end 304 adapted to be engaged by the movable head of the machine, as shown in Fig. 19. On the upper end of this arm is a projection 305 adapted to engage a triangular shaped projection 306 on the lower face of the switch tongue 282. As the movable head recedes the projection 305 on the arm 301 comes against the projection 306, on the switch tongue, and throws the switch tongue away from the center of the projection or roller 300, should the point of the switch tongue happen to be on this center, so that there is no possible danger of the point of the switch tongue striking the center of the roller 300. Nothing is claimed on this device in this application, as it forms no part of my present improvements. As the movable head advances, the projection 300 leaves the cam groove 284 of the shoe, and as it does so it brings the shoe back into line with the machine, and moves the plate 275 to bring the notch 276 into line with the center of the block 257, as shown in Fig. 50, the tack being now suspended on the plate 275, with its shank fitting in the notch 276, and its head resting on top of the plate. In the forward end of the block 257 is a half round groove 308, which, when the shoe is in its central position is opposite the notch 276 in the plate 275. 309, (see Figs. 52 and 53,) represents a pair of pincher like holders located in a housing 310, the bottom of which is formed by the folder 42; the members of this holder are pivoted at 311 to the housing 310, and between their inner ends is located a spring 312, which tends to keep the outer ends of the holders closed. In the outer ends of the holders is an opening 313, with a conical bottom, (see Fig. 55.) This opening receives the tacks as they fall from the plate 275, and the tack driver, at the proper time, enters this opening and drives the tacks from the holder into the last, the holder opening under the pressure of the driver, and when the driver recedes the holder closes again under the influence of the spring 312. The housing 310, with the folder 42 is secured to the movable head of the machine, as shown in Figs. 63 and 64, through means of a stem 316, upon which the housing and folder are formed, or to which they are secured, and this stem is secured to the movable head by means of a clamp 317, which permits of the longitudinal adjustment of the housing, with the holder and folder when desired. On the forward end of the housing 310 is a projection 318, preferably formed upon a plate 318ª secured to the housing by means of screws 319, (see Fig. 52.) This projection 318, has a half round opening 320 beneath which is an opening 321 in the plate 318ª, and in the housing 310. As the movable head recedes the half round opening 320 in the projection 318 registers with the half round opening in the block 257, thus forming a complete circle or circular opening into which the tack falls, and passing through the opening 321 is received by the holder 309. The tacks thus have a continuous, complete opening through which to pass to the holder. I have stated that when the shoe is brought back into line with the machine, the tacks are supported on the plate 275. Just as the movable head reaches the limit of its rearward movement, the tacks are dislodged from the plate through means of an arm 324, (see Figs. 42 and 45,) the normal position of the arm being shown in Fig. 45, while its inner position is shown in Fig. 42. The lower face of this arm has a notch 325 to permit the head of the tack to be carried by the plate 275 under the arm when the arm is in its normal position. The arm fits in the socket of a head 326, and is pressed downwardly by a spring 327. 328 is a horizontal extension of the head 326, and which fits in a socket of a bracket 329 secured to the block 257 by bolts 330. 331 is a spring located behind the extension 328 and which keeps the arm 324 in its outer position, except when it is forced back against the pressure of the spring. 332 is a lever hinged at 333 to the bracket 329. The lower end of this lever fits in an opening in the extension 328, as shown clearly in Fig. 42. 334 is an arm secured to the movable head 2, and which comes against the lever 332, just as the head reaches the limit of its rearward movement, and forces the arm 324 inwardly, dislodging the tack from the plate 275, and allowing it to drop into the holder. Then, when the movable head advances again, the spring 331 forces the arm 324 back to its normal position, to permit another tack to move or be brought beneath it at the notch 325. 340 represents the pusher, by which is meant the device that pushes the leather tightly up over the rounded edge of the last, as it is being drawn by the nippers, and before it is caught by the presser bar. This pusher is well illustrated in Figs. 19, 42, 45, 52, 53, 54 and 63. It consists of a leather tongue 341, secured to a head 342, held in a bar or rod 343, by means of a set screw 344 fitting in a slot 345 in the rod or bar. By loosening on the set screw the head 342 can be adjusted in or out. The bar 343 is supported on links 346, pivoted at 347 to the stationary head, the links being pivoted at 348 to the bar 343. A spring 349 connecting one of the arms 346 to the stationary head tends to draw the pusher forward until a projection 350 on one of the arms comes against the bed plate of the stationary head. The inner arm 360 has a projection 351 provided with a set screw 352, the inner end of which rests against a pivoted arm 353, which is provided with a friction roller 354, adapted to be engaged by the movable head 2 as it reaches the limit of its inward movement. This impact of the head 2, against the roller 354 causes the pusher to recede a short distance, and as the head begins to advance, and the leather is drawn by the nippers upwardly and forwardly, the pusher, against which the last is held by the operator, moves in a forwardly and upwardly direction under the influence of the spring 349, and forces the leather against the rounded edge of the last. As the movable head advances, it carries with it a tack in the holder 309, and as the head reaches the limit of its forward movement, the tack is driven through means of a driver consisting of a pin 360, secured to the lower end of a vertical rod 361 held and guided in the movable head, as shown in Figs. 19 and 42.

I will now describe the mechanism by which the driver is automatically operated. The mechanism is well shown in Figs. 1, 2, 10 and 19. 361 represents a lever pivoted at 362 to a standard 363 on the movable head of the machine. The outer end of this lever is connected by a link 364 to the upper end of the driver. The inner end of the lever is provided with a friction roller 365, adapted to be engaged, when the movable head recedes, by a horn 366, on a bracket 367, secured to the stationary head of the machine. The horn has an inclined surface 368, against which the roller 365 impinges, to cause the ascent of the outer end of the lever, and the consequent ascent of the driver, as the movable head reaches the limit of its rearward movement. The horn has a horizontal portion 369 against which the roller 365 bears when the movable head is in its inner or rear position. The driver is provided with a collar 371, on its upper end. This collar has a projection 372, to receive the upper end of an arm 373, pivoted at 374 to the movable head 2. 375 is an arm pivoted at 376 to the fixed head 3, and the lower end of which impinges against a set screw 377, see Fig. 2. By adjusting the set screw, the inclination of the arm may be changed. 378 represents an arm pivoted to the fixed head 3, at 379. This arm has a stop 380 for limiting its movement toward the arm 375. 381 represents a spring connecting the upper ends of the arms 375 and 378. The tension of this spring may be regulated by adjusting the screw 377. 382 represents a projection rigidly secured to the pintle 362, which pivots the lever 361 to the standard 363. The lever 361 is also rigidly secured to this pintle.

The operation of this part of my improvement is as follows:—As the movable head recedes and just as it is about to reach the limit of its inward movement, the roller 365 on the lever 361 comes against the inclination 368 of the horn 366, thus lifting the driver, as stated. When the driver is thus raised, a projection 384, on the arm 373 comes against a bracket or projection 385, on the fixed head of the machine, and forces the upper end of the arm beneath the projection 372 on the upper end of the driver, as shown in Fig. 19, the arm being held in either position to which it may be moved by means of a flat friction spring 386, secured to the standard 363, and bearing with its free end against the side of the arm. As the movable head advances, the inner end of the lever 361 is carried from under the horn 366, and the driver is now suspended by the arm 373. The continued movement of the head brings the projection 382 against the arm 378, and expands the spring 381, by forcing the arm 378 away from the arm 375. When the movable head has reached the point where the tack is to be driven, the arm 373 comes against an adjustable projection or bracket 387, secured to the fixed head of the machine, see Fig. 2, and the arm is thus disengaged from the projection 372, when the driver will be impelled forcibly downward by the spring 381, the force of which is imparted to the driver through means of the projection 382, and the lever 361, through means of the connecting pintle 362. Then when the movable head recedes again, the driver is again raised, as described, and thus the operation goes on automatically. 388 represents a plug fitting in the socket 389 on the movable head. Beneath this plug is a spring, as shown in Fig. 19, and the office of the plug is to form a cushion for the inner end of the lever 361, as it is forced down by coming into engagement with the horn 366. 390 represents a presser foot which bears upon the upper where it has been tacked and holds the upper in opposition to the pull of the pinchers, to keep the tacks from being drawn out of the last by the pinchers. This presser foot is secured to a hinged lever 391, pivoted at 392 to the fixed head of the machine and having a roller 393 on its upper end, which is engaged by a projection 394 on the cam 38.

I claim as my invention—

1. In a lasting machine, the combination of a spindle, nippers pivoted to the spindle, means for moving the spindle, a vertically movable sleeve surrounding the spindle, means for moving the sleeve, a slotted head carried by the sleeve, rollers fitted in the slot of the head, springs for forcing said rollers inwardly, and a fixed roller secured centrally to the head; substantially as and for the purpose set forth.

2. In a lasting machine, the combination of a spindle, nippers carried by the spindle, means for moving the spindle, a sleeve surrounding the spindle, and having a head adapted to bear against the jaws of the nippers, a lever for moving the sleeve and cams 33, 34, for operating the sleeve lever; said cam 34 being adjustable relatively to the cam 35; substantially as and for the purpose set forth.

3. In a lasting machine, the combination of a spindle, nippers carried by the spindle, means for moving the spindle, a sleeve surrounding the spindle, and provided with a head adapted to bear against the jaws of the nippers, a lever for moving the sleeve, and cams 33, 34, for operating the sleeve lever; said cam 34 having a portion 41 and fitting on the hub of the cam 33, and said cam 33 having a gap to receive the body of the cam 34, and permit the movement of the latter; substantially as and for the purpose set forth.

4. In a lasting machine, the combination of a spindle, means for moving the spindle, nippers carried by the spindle, a sleeve surrounding the spindle and having a head adapted to bear against the jaws of the nippers, a lever for moving said sleeve and cams 33, 34; said cam 33 having a gap 33$^a$, and a recess 47; and said cam 34 being clamped to the hub of the cam 33, and having a portion 41 and rim 34$^a$ adapted to overlap the notched rim of the cam 33, all substantially as and for the purpose set forth.

5. In a lasting machine, the combination of suitable power-connections for driving the machine, having an interposed clutch, nippers for grasping the leather, a pump for regulating the tension of the nippers on the leather, a treadle for operating the valve of the pump, and which is provided with a lug 88, a lever connected to the clutch of the machine, and adapted to be engaged by said lug on the treadle, and a hinged bar 93 adapted to engage in a notch in said lever; substantially as and for the purpose set forth.

6. In a lasting machine, the combination of a suitable power-shaft having a clutch for communicating motion to the machine nippers for grasping the leather, a pump for regulating the tension of the nippers on the leather, a treadle for operating the valve of the pump, and which is provided with a lug 88, a spring-actuated bar 81 connected to said treadle, a lever connected to the clutch of the machine, and which is adapted to be engaged by said lug on the treadle, and a hinged spring-actuated bar 93, all substantially as and for the purpose set forth.

7. In a lasting machine, the combination of nippers, a lever for operating the nippers, a tension spring connected to the lever, a pump regulating the tension of the spring, and a forked rod 107, under the control of the pump, and which serves as a stop; substantially as and for the purpose set forth.

8. In a lasting machine, the combination of nippers, a lever through which the nippers are operated, a pump having spring connection with said lever, a forked rod 107 engaging said lever, and an eccentric for moving said rod, and which is connected to the piston of the pump; substantially as and for the purpose set forth.

9. In a lasting machine, the combination of nippers, a lever for operating the nippers, a pump having spring connection with said lever, a rod engaging said lever, an eccentric to which the lower end of the rod is connected, a shaft upon which the eccentric is mounted, a lever on said shaft, and a bar or rod connecting said lever to the cross-head on the piston rod of the pump; substantially as and for the purpose set forth.

10. In a lasting machine, the combination of an adjustable work-feed, tack-feed devices containing tacks of different sorts, a side shaft having working connections for adjusting the work-feed, and for throwing either tack-feed into operation, and an escapement device for shifting the position of the side shaft, substantially as set forth.

11. In a lasting machine, the combination of the adjustable work-feed and tack-devices feeding tacks of different sorts, a side shaft having working connections for adjusting the work-feed, and for throwing in either tack-device, an escapement connected to the side-shaft, and means for imparting movement to the escapement; substantially as and for the purpose set forth.

12. In a lasting machine, the combination of an adjustable work-feed, separate tack-devices feeding tacks of different lengths, a side shaft adjusting the work-feed and throwing in either tack-device, an escapement-wheel having crank and link connection with the side shaft, a shaft upon which the escapement-wheel is mounted, a loose pulley on said shaft, a fixed disk on said shaft, a spring for forcing the pulley against the disk, and means for moving the arms of the escapement; substantially as and for the purpose set forth.

13. In a lasting machine, the combination of an adjustable work-feed and tack-devices feeding tacks of different kinds, a side shaft adjusting the work-feed and changing the tack-devices, an escapement having crank-and-link connection with the side-shaft, a shaft on which the escapement is mounted, mechanism for turning said shaft, a bar connected to the arms of the escapement, and a pivoted finger-piece to which said bar is also connected; said finger-piece being located at the forward end of the machine; substantially as and for the purpose set forth.

14. In a lasting machine, the combination of an adjustable work-feed, tack-devices feeding different kinds of tacks, a side shaft adjusting the work-feed and throwing in either tack-device, an escapement having crank and link-connection with the side-shaft, means for turning the escapement, and means for releasing the escapement; said escapement consisting of an escapement-wheel having projections 182, and arms 186 and 187 for engaging said projections; substantially as and for the purpose set forth.

15. In a lasting machine, the combination of an adjustable work-feed, tack-devices feeding different kinds of tacks, a side shaft having connection with said feed and tack-devices to change them as explained, an escapement-wheel having crank-and-link connection with the side shaft and having strips 183 and notches 185, a shaft for turning the escapement when the latter is released and pivoted arms 187 formed respectively with an end 192 for entering the notches and a hook 19 for engaging said strips; substantially as and for the purpose set forth.

16. In a lasting machine, the combination of an adjustable work-feed and interchanging tack-devices of substantially the character specified, an escapement having working connections with said work-feed and tack-devices for the purpose of shifting them in the manner explained, a shaft having frictional driving connection with the escapement-wheel and the vibrating arms for impinging said escapement and holding it normally in opposition to said frictional driving connection but having means for releasing them and permitting the escapement to be turned by its shaft when it is desired to shift the feed and tack-devices; substantially in the manner explained.

17. In a lasting machine, a feed point, mechanism for imparting a vertical movement to the feed point, mechanism for imparting a horizontal movement to the feed point, and mechanism for varying the horizontal movement of the feed point, consisting essentially of a side shaft, a hinged lever, an arm secured to the lever, and a bracket on the side shaft having a double cam groove engaging said lever; substantially as and for the purpose set forth.

18. In a lasting machine, the combination of the feed point, mechanism for imparting a vertical movement to the feed point, mechanism for imparting a horizontal movement to the feed point, and mechanism for varying the horizontal movement of the feed-point; consisting essentially of a side shaft, a hinged lever, an arm adjustably secured to the hinged lever, and a bracket having a double groove, and which connects said lever to the side shaft; substantially as and for the purpose set forth.

19. In a lasting machine, the combination of a feed point, mechanism for moving the feed point vertically, mechanism for moving the feed point horizontally, and mechanism for varying the horizontal movement of the feed point; consisting essentially of a side shaft, a bracket secured to the shaft, and having a double V-groove, a hinged lever having a pin fitting in said groove of the bracket, an arm secured to the lever, a rod passing through a slot in said arm, and a lever with which said bar engages, and which is secured to the vertical rod of said feed point; substantially as and for the purpose set forth.

20. In a lasting machine, the combination of a work feed and separate tack-devices, a side shaft having connections for manipulating the work-feed and tack-devices, an escapement having crank-and-link connection with the side-shaft and provided with means by which it is turned, said escapement having a vibrating detent-arm and having notches into which said arm enters to lock the escapement against forward or retrograde movement, as and for the purposes explained.

21. In a lasting machine, the combination of nippers, a lever operating the nippers, a cam for moving the lever, a side shaft, means for operating the side shaft, and means for moving said cam so that it will not operate upon said lever, consisting essentially of a lever $160^d$, engaging said cam, and having a lug $160^c$ to be engaged by a projection on said side shaft; substantially as and for the purpose set forth.

22. In a lasting machine, the combination of nippers, a lever for operating said nippers, a cam for moving said lever, a side shaft, and an escapement device for operating the side shaft, and means for moving said cam out of position to operate upon said lever; said means consisting essentially of a pivoted lever $160^d$ having a lug $160^c$ adapted to be engaged by a projection on said side shaft; substantially as and for the purpose set forth.

23. In a lasting machine, the combination of nippers, a lever operating the nippers, a cam for moving said lever, a side shaft, a work-feed mechanism, and a tack-feeding mechanism operated by said side shaft, and mechanism for moving said cam out of position to operate upon said lever, consisting essentially of a lever $160^d$ controlling the cam and having a lug $160^c$, a projection on said side shaft engaging said lug; substantially as and for the purpose set forth.

24. In a lasting machine, the combination of nippers, a lever for operating the nippers, a cam for moving the lever, and which is provided with an extension, and means for moving said cam out of the position for closing said nippers, which consists essentially of a pivoted lever engaging the extension on the cam and having a lug $160^c$, and a side shaft under control of the operator having a projection $160^b$ for engaging said lug; substantially as and for the purpose set forth.

25. In a lasting machine, the combination with the nippers, the lever for operating the nippers, and a cam having faces for moving the lever; of a side shaft under control of the operator and having working connection with said cam for throwing it out of position; the opening face of said cam projecting beyond the face which operates the lever to close the nippers, so that should the nippers be closed, when the cam is moved they will be opened by said projecting cam, as explained.

26. In a lasting machine, the combination of tack-boxes, race-ways fitting within the tack-boxes, at their upper ends, tappers for striking the race-ways, and means loosely supporting but not attached to the lower ends of the race-ways, consisting of a block 257, and arms 259, and set screws 258, bearing against the race-ways; substantially as and for the purpose set forth.

27. In a lasting machine, a solid race-way formed with a groove 261, and an opening 260, in combination with a plate, 262, and straps 264, securing the plate over the race-way; substantially as and for the purpose set forth.

28. In combination with a lasting machine, a tack carrier plate, a shoe for moving said plate a switch tongue pivoted to the shoe and means for moving said switch tongue, consisting of a side shaft, a lever operated by the side shaft and provided with a projection, a collar on said shaft having an upwardly extending arm adapted to be engaged by the projection on said lever, a downwardly projecting arm on said collar, and which is connected by a spring to a fixed part of the machine, a second collar on said side shaft, carrying an arm and a connection between said last mentioned arm and said switch point; substantially as and for the purpose set forth.

29. In combination with a lasting machine, a tack carrying plate, a shoe adapted to move said plate a switch point pivoted to said shoe, and means for moving said switch point, consisting of a side shaft, a lever having a projection and adapted to be moved by said side shaft, a collar on the side shaft having an upwardly extending projection adapted to be engaged by the projection on said lever, a downwardly exending arm on said collar connected by a spring to a fixed part of the machine, a second collar on said side shaft, an arm on said last mentioned collar, a connection between said last mentioned arm and said switch point, and a spring 295 surrounding said collars and engaging said downwardly extending arms; substantially as and for the purpose set forth.

30. In combination with a lasting machine, a tack carrying plate, a block having a half round opening, and to which the tack carrying plate is pivoted, a holder, a movable housing carrying said holder, and a plate secured to said housing, and having a projection 318, with a half round opening adapted to register with the opening in said block when the movable head of the machine is in its inner position; substantially as and for the purpose set forth.

31. In combination with a lasting machine, a tack carrying plate, a block to which the tack carrying plate is pivoted, and which is provided with a half round opening, a holder, a housing within which the holder is located and which is adjustably secured to the movable head of the machine, a plate having a perforation registering with a perforation in said housing, and a projection on said plate having a half round opening adapted to register with said opening in said block; substantially as and for the purpose set forth.

32. In combination with a lasting machine, a tack carrying plate, a notched arm 324, a head 326 receiving said arm, and having a horizontal extension 328, a bracket having a socket to receive the horizontal extension of the head, a spring 331, a lever 332 and a projection 334 on the movable head of the machine; substantially as and for the purpose set forth.

33. In combination with a lasting machine, a tack carrying plate, a notched arm 324, a hollow head 326, a spring 327 located in the hollow head, and adapted to force said arm in a downwardly direction, a horizontal extension on said head, a bracket receiving the horizontal extension of the head, a spring 331, and a lever 332, and a projection 334 on the movable head of the machine; substantially as and for the purpose set forth.

34. In a lasting machine, a pusher consisting of a head having a tongue, a bar to which the head is secured, hinged arms to which said bar is pivoted, a spring for drawing the bar forwardly, and means for causing said bar to be forced rearwardly as the movable head recedes; substantially as and for the purpose set forth.

35. In a lasting machine, a pusher consisting of a head having a tongue, a bar to which the head is adjustably secured, hinged arms to which the bar is pivoted, a spring for drawing the bar forwardly, a pivoted arm having a roller 354 adapted to be engaged by the movable head of the machine, and an extension 351 having a set screw 352; substantially as and for the purpose set forth.

CHARLES SINNING.

In presence of—
A. M. EBERSOLE,
GEORGE E. EBERSOLE.